United States Patent
Spelman et al.

(10) Patent No.: US 10,292,412 B2
(45) Date of Patent: May 21, 2019

(54) HIGH SOLUBILITY NATURAL SWEETENER COMPOSITIONS

(71) Applicants: Kieran P. Spelman, New City, NY (US); Daniel Piorkowski, Fairfield, CT (US); Dominic J. Vellucci, Bronxville, NY (US); Karl Ragnarsson, Chester, NY (US)

(72) Inventors: Kieran P. Spelman, New City, NY (US); Daniel Piorkowski, Fairfield, CT (US); Dominic J. Vellucci, Bronxville, NY (US); Karl Ragnarsson, Chester, NY (US)

(73) Assignee: KRAFT FOODS GLOBAL BRANDS LLC, Northfield, IL (US)

( * ) Notice: Subject to any disclaimer, the term of this patent is extended or adjusted under 35 U.S.C. 154(b) by 322 days.

(21) Appl. No.: 13/767,642

(22) Filed: Feb. 14, 2013

(65) Prior Publication Data
US 2013/0209658 A1    Aug. 15, 2013

Related U.S. Application Data

(60) Provisional application No. 61/599,279, filed on Feb. 15, 2012.

(51) Int. Cl.
A23L 27/30    (2016.01)

(52) U.S. Cl.
CPC ............... *A23L 27/36* (2016.08); *A23L 27/30* (2016.08)

(58) Field of Classification Search
CPC ........ A23L 1/2363; A23L 1/2366; A23L 2/60; A23L 29/30; A23L 27/34; A23V 2002/00; A23V 2250/24; A23V 2250/032; A23V 2250/64; A23V 2250/258; A23V 2250/262
USPC ................................................. 426/590, 658
See application file for complete search history.

(56) References Cited

U.S. PATENT DOCUMENTS

| | | | |
|---|---|---|---|
| 4,599,403 A | 7/1986 | Kumar | |
| 4,612,942 A | 9/1986 | Dobberstein et al. | |
| 6,365,217 B2 | 4/2002 | Fotos et al. | |
| 7,838,044 B2 | 11/2010 | Abelyan et al. | |
| 7,862,845 B2 | 1/2011 | Magomet et al. | |
| 7,923,552 B2 | 5/2011 | La Rovere | |
| 8,029,846 B2 | 10/2011 | Talebi et al. | |
| 8,535,747 B2 | 9/2013 | Lee et al. | |
| 2006/0142555 A1 | 6/2006 | Jonnala et al. | |
| 2007/0116828 A1 | 5/2007 | Prakash et al. | |
| 2007/0116837 A1 | 5/2007 | Prakash et al. | |
| 2007/0116839 A1 | 5/2007 | Prakash et al. | |
| 2007/0292582 A1 | 12/2007 | Dubois et al. | |
| 2008/0064063 A1 | 3/2008 | Brandle et al. | |
| 2008/0226773 A1 | 9/2008 | Lee | |
| 2008/0226790 A1 | 9/2008 | Johnson et al. | |
| 2008/0226802 A1* | 9/2008 | Lee | 426/594 |
| 2008/0226804 A1 | 9/2008 | Talebi et al. | |
| 2008/0292765 A1 | 11/2008 | Prakash et al. | |
| 2008/0299277 A1 | 12/2008 | Chao et al. | |
| 2009/0162487 A1 | 6/2009 | Bell et al. | |
| 2010/0099857 A1 | 4/2010 | Evans et al. | |
| 2010/0112130 A1 | 5/2010 | Abelyan et al. | |
| 2010/0112158 A1 | 5/2010 | Abelyan et al. | |
| 2010/0255171 A1 | 10/2010 | Purkayastha et al. | |
| 2010/0278993 A1 | 11/2010 | Prakash et al. | |
| 2011/0059218 A1 | 3/2011 | Corliss et al. | |
| 2011/0059219 A1 | 3/2011 | Wild et al. | |
| 2011/0097447 A1 | 4/2011 | Roy et al. | |
| 2011/0104353 A1 | 5/2011 | Lee | |
| 2011/0195161 A1 | 8/2011 | Upreti et al. | |
| 2011/0195169 A1 | 8/2011 | Markoysan et al. | |

FOREIGN PATENT DOCUMENTS

| | | |
|---|---|---|
| CN | 101340824 | 1/2009 |
| CN | 101662954 | 3/2010 |
| CN | 101662955 A | 3/2010 |
| CN | 101662958 | 3/2010 |
| CN | 101677624 | 3/2010 |
| EP | 2386211 A1 | 11/2011 |
| JP | 07177862 A | 7/1995 |
| JP | 2010516764 A | 5/2010 |
| KR | 790501 B1 * | 1/2008 |
| WO | 2007061795 | 5/2007 |
| WO | 2008091547 A2 | 7/2008 |
| WO | 2008112852 A1 | 9/2008 |
| WO | 2008112857 A1 | 9/2008 |
| WO | 2008112961 A1 | 9/2008 |
| WO | 2011024199 A1 | 3/2011 |
| WO | 2011037959 A1 | 3/2011 |
| WO | 2011046423 A1 | 4/2011 |
| WO | 2012082587 A1 | 6/2012 |
| WO | 2013123281 | 8/2013 |

OTHER PUBLICATIONS

ISR for International Patent Application No. PCT/US2013/026267 dated Jul. 22, 2013.
Kroyer, Gerhard; "Stevioside and Stevia-Sweetener in Food: Application, Stability and Interaction with Food Ingredients"; Journal fur Verbraucherschutz und Lebensmittelsicherheit; vol. 5, No. 2; Feb. 11, 2010; pp. 225-229.
International Preliminary Report on Patentability for International Application PCT/US2013/026267, dated Aug. 19, 2014, 7 pages.
"Introduction to Food Science", Rongrong Lu, Chemical Industry Press (CIP), dated Sep. 30, 2008, p. 199.
"Introduction to Food Production", Qing Zhao etc., SciencePress, Aug. 31, 2004, p. 223.
First Chinese Office Action issued in connection with Chinese Patent Application No. 201380012418.8, dated Jul. 24, 2015, 36 pages.
Australian Patent Application No. 2013221447 Patent Examination Report No. 1 dated Nov. 28, 2015 (4 pages).

(Continued)

*Primary Examiner* — Jyoti Chawla
(74) *Attorney, Agent, or Firm* — Morgan, Lewis & Bockius, LLP

(57) ABSTRACT

A food composition including a solution of about 5,000 ppm to about 300,000 ppm steviol glycoside; about 1,000 ppm to about 995,000 ppm food grade non-aqueous solvent; with a balance being water.

21 Claims, 20 Drawing Sheets

(56) References Cited

OTHER PUBLICATIONS

Chinese Patent Application No. 201380012418.8 Notice on the First Office Action dated Jul. 24, 2015 (32 pages).
Chinese Patent Application No. 201380012418.8 Notice on the Second Office Action dated Mar. 18, 2016 (17 pages).
Chinese Patent Application No. 201380012418.8 Notice on the Third Office Action dated Dec. 5, 2016 (24 pages).
Chinese Patent Application No. 201380012418.8 Decision on Rejection dated Aug. 1, 2017 (15 pages).
European Patent Application No. 13707086.8 Communication pursuant to Article 94(3) EPC dated Mar. 20, 2017 (5 pages).
Japanese Patent Application No. 2014-557795 Office Action Summary dated Dec. 6, 2016 (7 pages).
Japanese Patent Application No. 2014-557795 Office Action Summary dated Aug. 8, 2017 (6 pages).
Russian Patent Application No. 2014134743 Office Action dated Jan. 30, 2017 (5 pages).
Russian Patent Application No. 2014134743 Office Action dated Jul. 7, 2017 (5 pages).

* cited by examiner

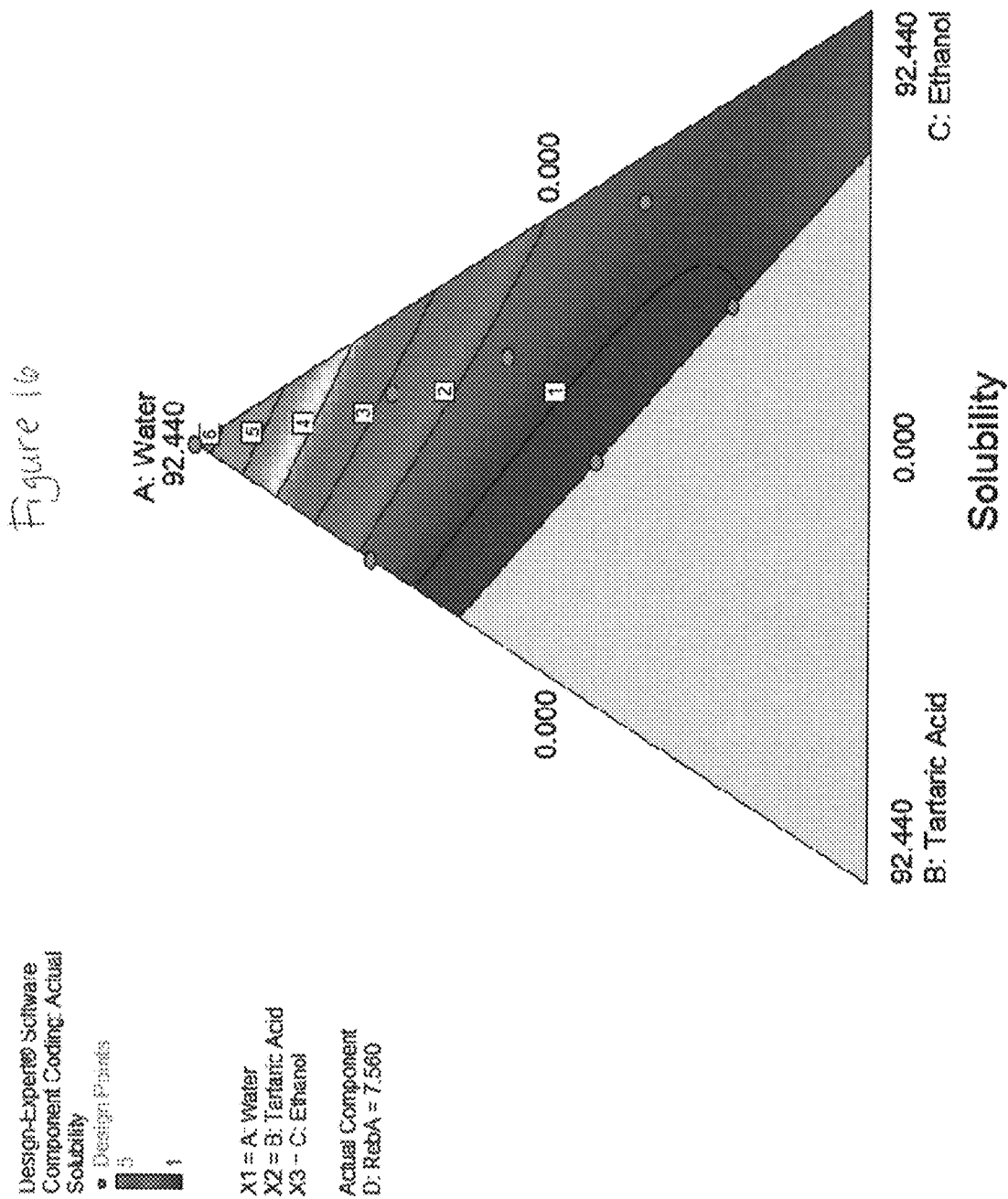

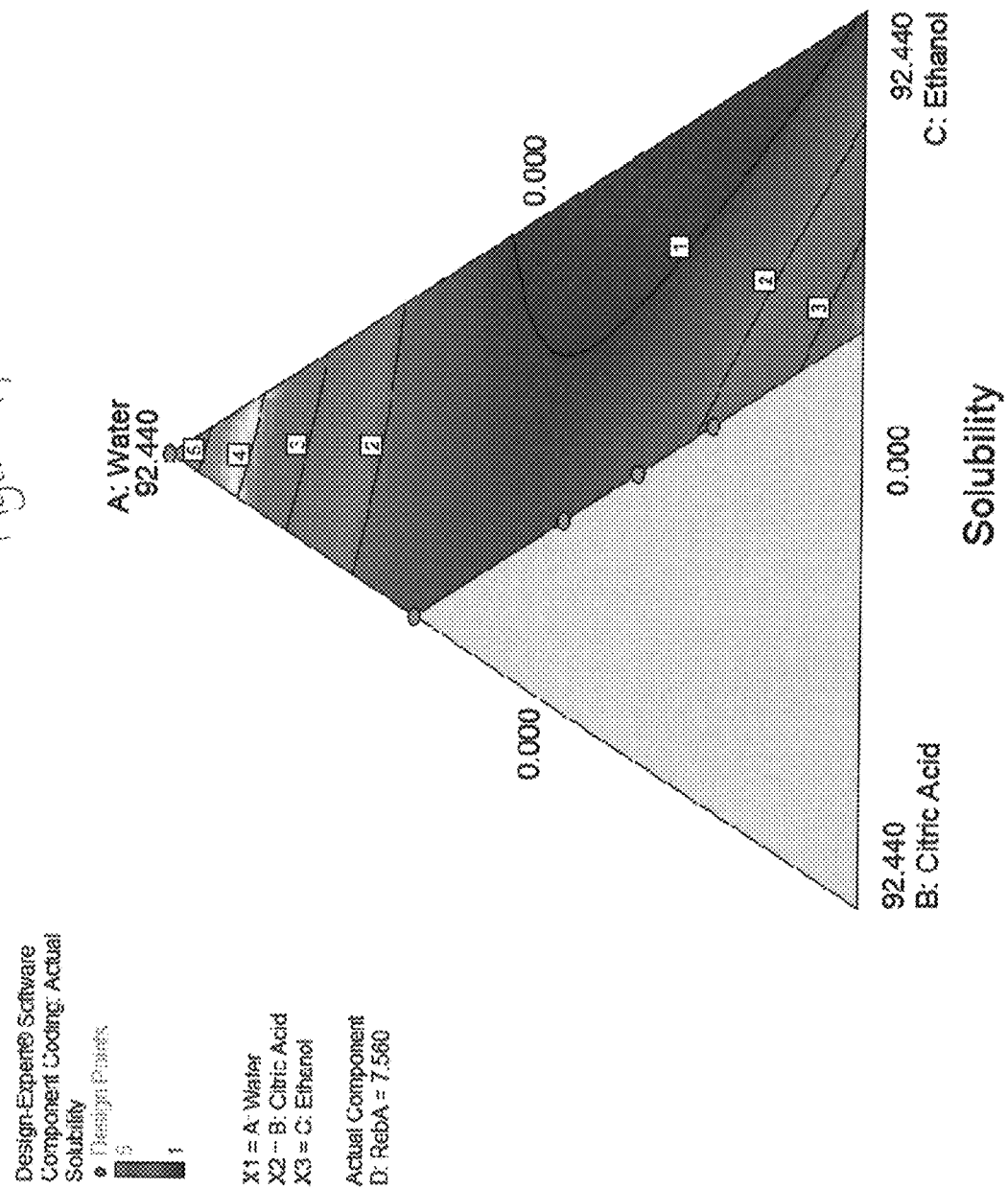

HIGH SOLUBILITY NATURAL SWEETENER COMPOSITIONS

CROSS-REFERENCE TO RELATED APPLICATIONS

This application claims priority benefit from U.S. Provisional Patent Application No. 61/599,279, filed on Feb. 15, 2012, which is incorporated by reference in its entirety.

BACKGROUND OF THE INVENTION

The present invention generally relates to compositions and methods for a food composition, such as a sweetening or flavor enhancing liquid concentrate, demonstrating sustained solubility of a sweetener over a desired length of time.

BRIEF SUMMARY OF THE INVENTION

According to some embodiments of the present invention, a food composition includes a solution of about 5,000 ppm to about 300,000 ppm steviol glycoside; about 1,000 ppm to about 995,000 ppm food grade non-aqueous solvent; with a balance being water.

According to some embodiments of the present invention, a food composition includes a solution of about 5,000 ppm to about 300,000 ppm steviol glycoside; about 100 ppm to about 600,000 ppm acid; with a balance being water.

According to some embodiments of the present invention, a food composition includes a solution of about 5,000 ppm to about 300,000 ppm steviol glycoside; about 500 ppm to about 200,000 ppm of an amphiphilic substance; with a balance being water.

In some embodiments, the steviol glycoside is at least about 95% rebaudioside A. The steviol glycoside component may include but is not limited to a mixture of stevioside and other steviol glycosides, such as rebaudioside A, rebaudioside B, rebaudioside C, rebaudioside D, rebaudioside E, rebaudioside F, dulcoside A, dulcoside B, rubusoside, stevia, stevioside, and steviolbioside. In some embodiments, the stevioside is present in a ppm ratio of stevioside:other steviol glycosides of from about 1:1 to 1:1,500.

The food composition may include about 100 ppm to about 600,000 ppm acid. In some embodiments, the food composition includes an organic acid and/or an inorganic acid. The acid may be selected from citric acid, malic acid, tartaric acid, phosphoric acid, lactic acid, fumaric acid, adipic acid, sodium acid sulfate; potassium acid sulfate, sodium acid pyrophosphate, and combinations thereof.

In some embodiments, the food composition includes about 500 ppm to about 200,000 ppm of an amphiphilic substance. The amphiphilic substance may include lactic acid, terpineol, benzyl alcohol, 1-butanol, 1-proponol, propionic acid, caprylic acid, 2-methoxyphenol, butyric acid, hexanoic acid, isobutanol, 2-ethylpyrazine, 2-methylthiol 3 methyl pyrazine, benzaldehyde, pentanoic acid, 3-methyl, butyl 1 lactate, valeric acid, 2 mercaptopropinic acid, 4-allyl-2-methoxyphenol, phenyl acetic acid, phenethyl alcohol, 2-methoxy-4-[1-propen-1-yl]phenol, 9 decenoic acid, 5 & 6 decenoic Acid, 1-octanol, 1-decanol, hexyl alcohol, and combinations thereof.

In some embodiments, the food composition includes about 1,000 ppm to about 995,000 ppm food grade non-aqueous solvent. The food grade non-aqueous solvent may include ethanol, propylene glycol, 1,3-propanediol, triacetin, ethyl acetate, benzyl alcohol, glycerin, and combinations thereof.

In some embodiments, steviol glycosides stay in solution for at least one week to about 33 months.

In some embodiments, the composition is a liquid concentrate. The liquid concentrate can be reconstituted in a range of about 1 part concentrate added to about 5 parts water to about 1 part concentrate added to about 180 parts water; about 1 part concentrate added to about 5 parts water to about 1 part concentrate added to about 180 parts water to produce a brix or brix equivalence of about 2 to about 25; about 1 part concentrate added to about 5 parts water to produce a brix or brix equivalence of about 2 to about 25; about 90 parts water to produce a brix or brix equivalence of about 2 to about 25; or about 120 parts water to produce a brix or brix equivalence of about 2 to about 25.

In some embodiments, the food composition has a pH of about 1.8 to about 4.0.

BRIEF DESCRIPTION OF THE SEVERAL VIEWS OF THE DRAWINGS

The foregoing summary, as well as the following detailed description of certain embodiments of the food product will be better understood when read in conjunction with the following exemplary embodiments, the appended drawing and the appendices.

FIGS. 2 through 19 show solubility of rebaudioside A in various liquid concentrate solutions.

DETAILED DESCRIPTION OF THE INVENTION

Figure 1:
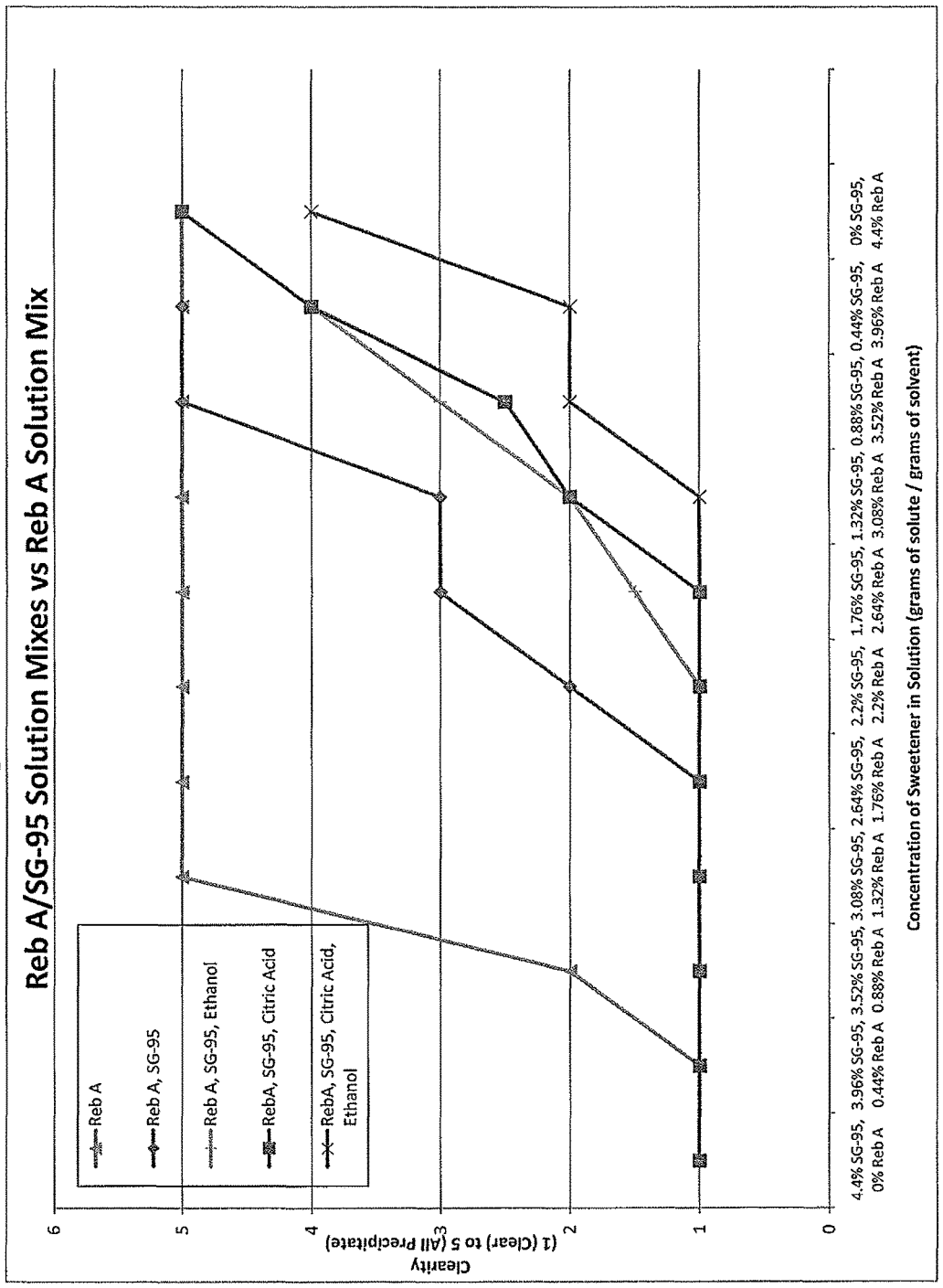
FIG. 1 shows solubility of rebaudioside A in various liquid concentrate solutions.
Figure 2:
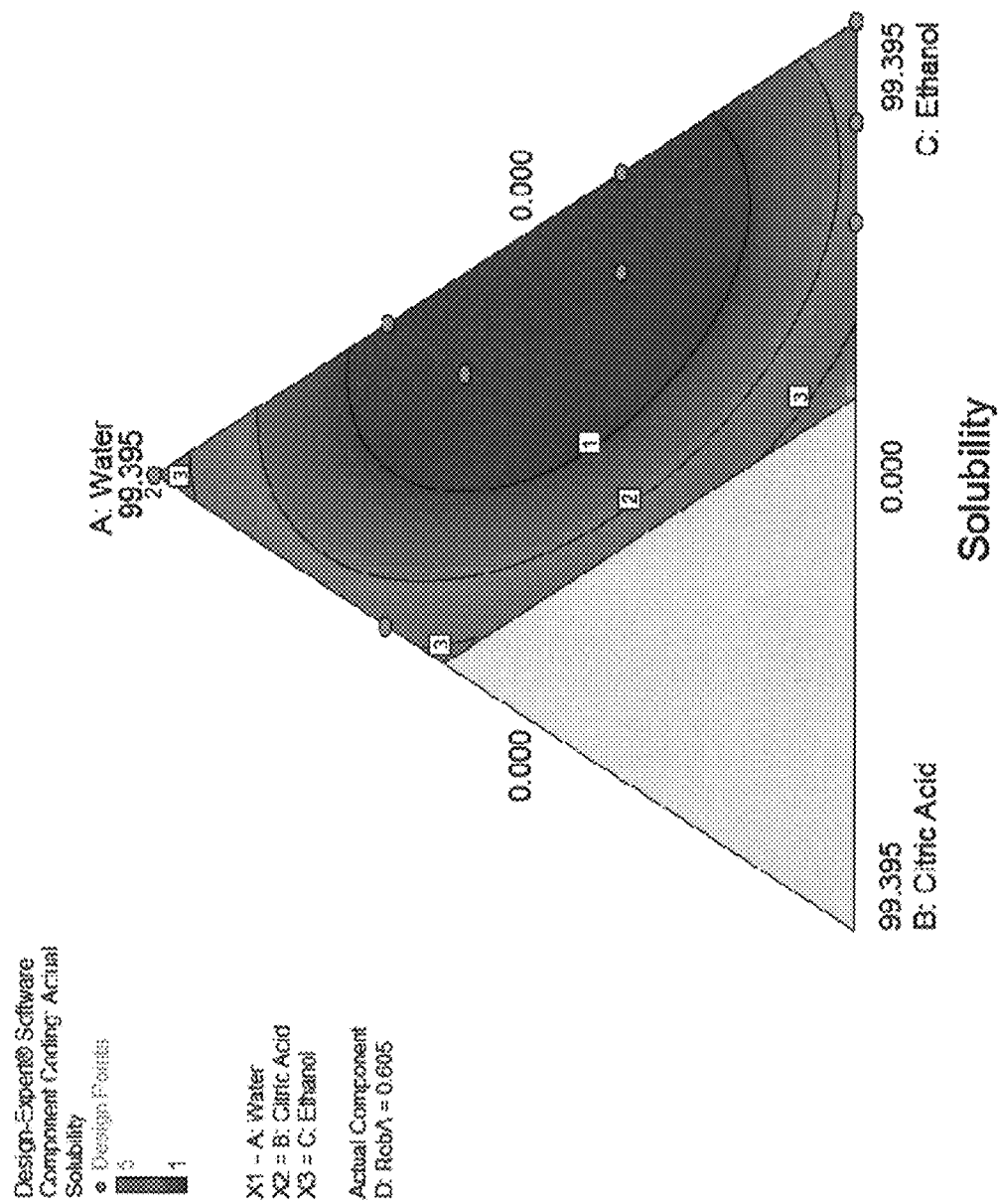
Figure 3:
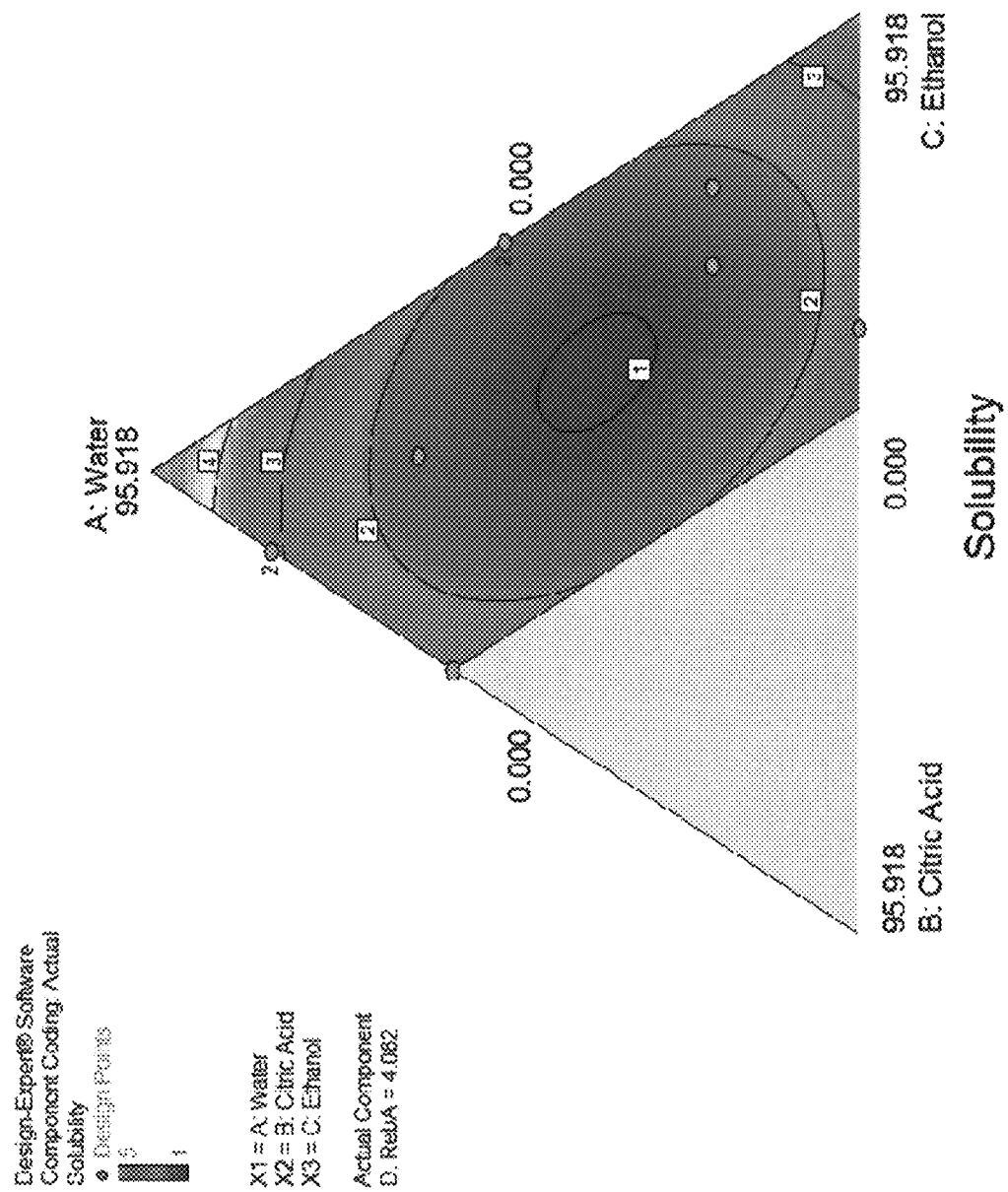
Figure 4:
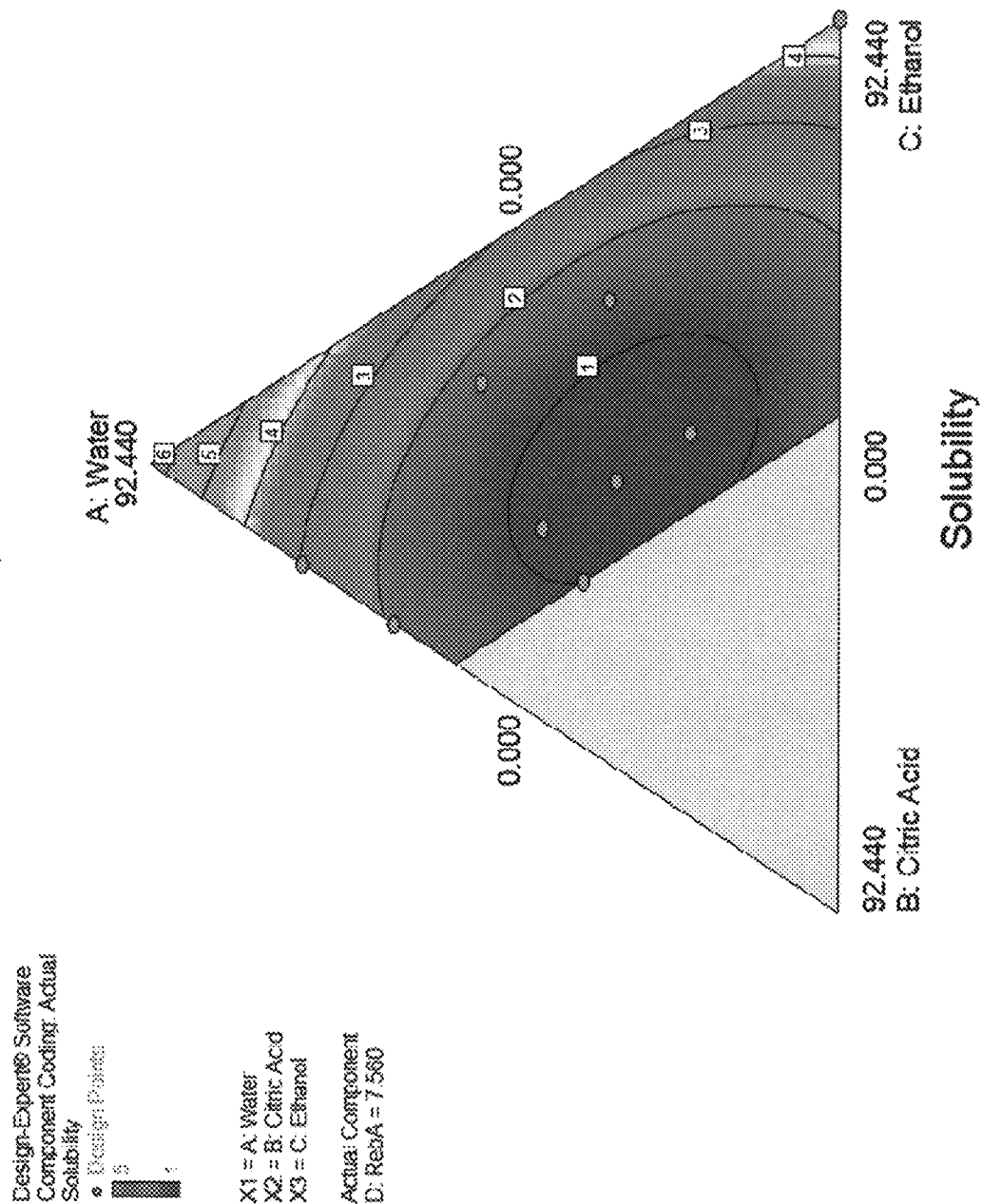
Figure 5:
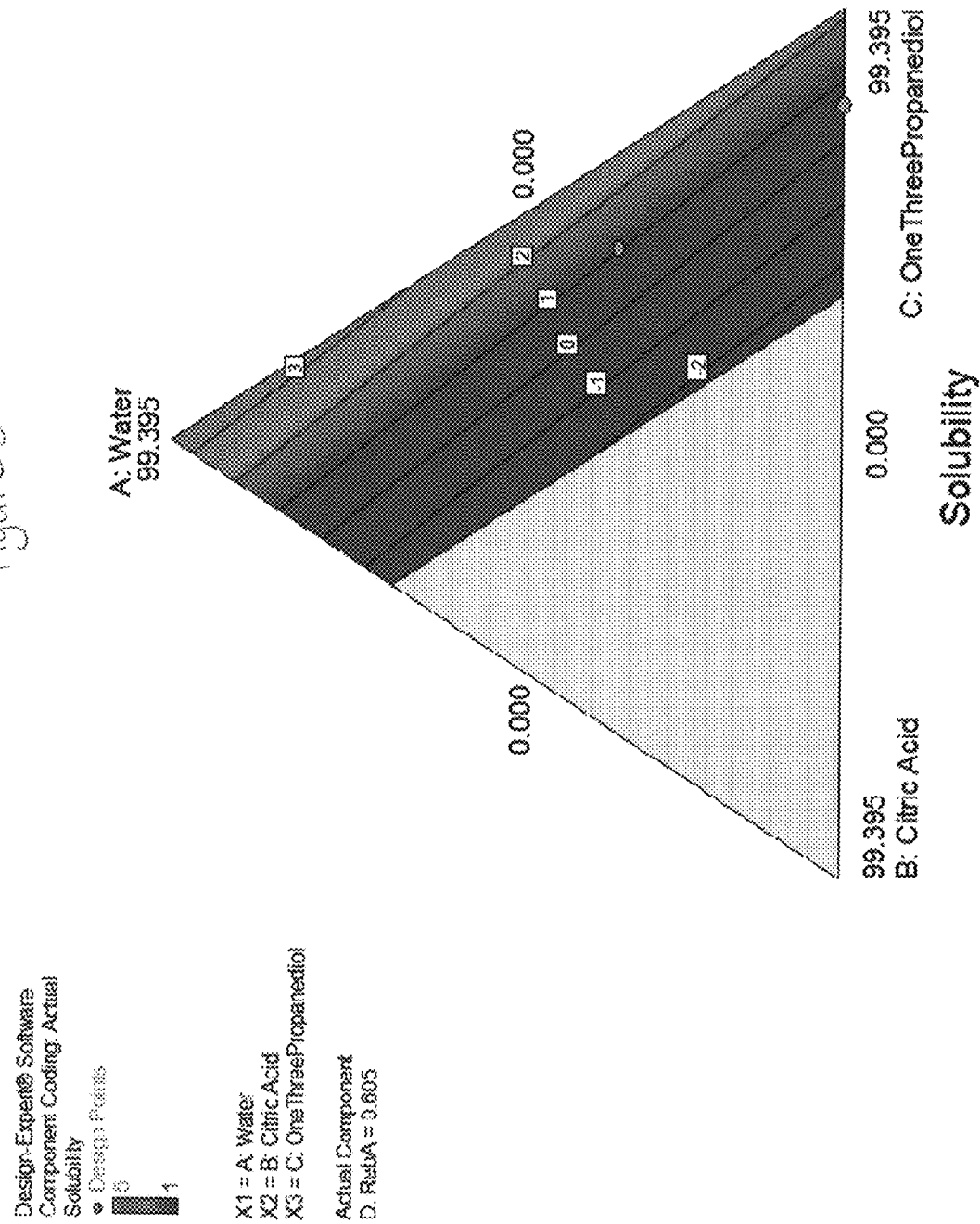
Figure 6:
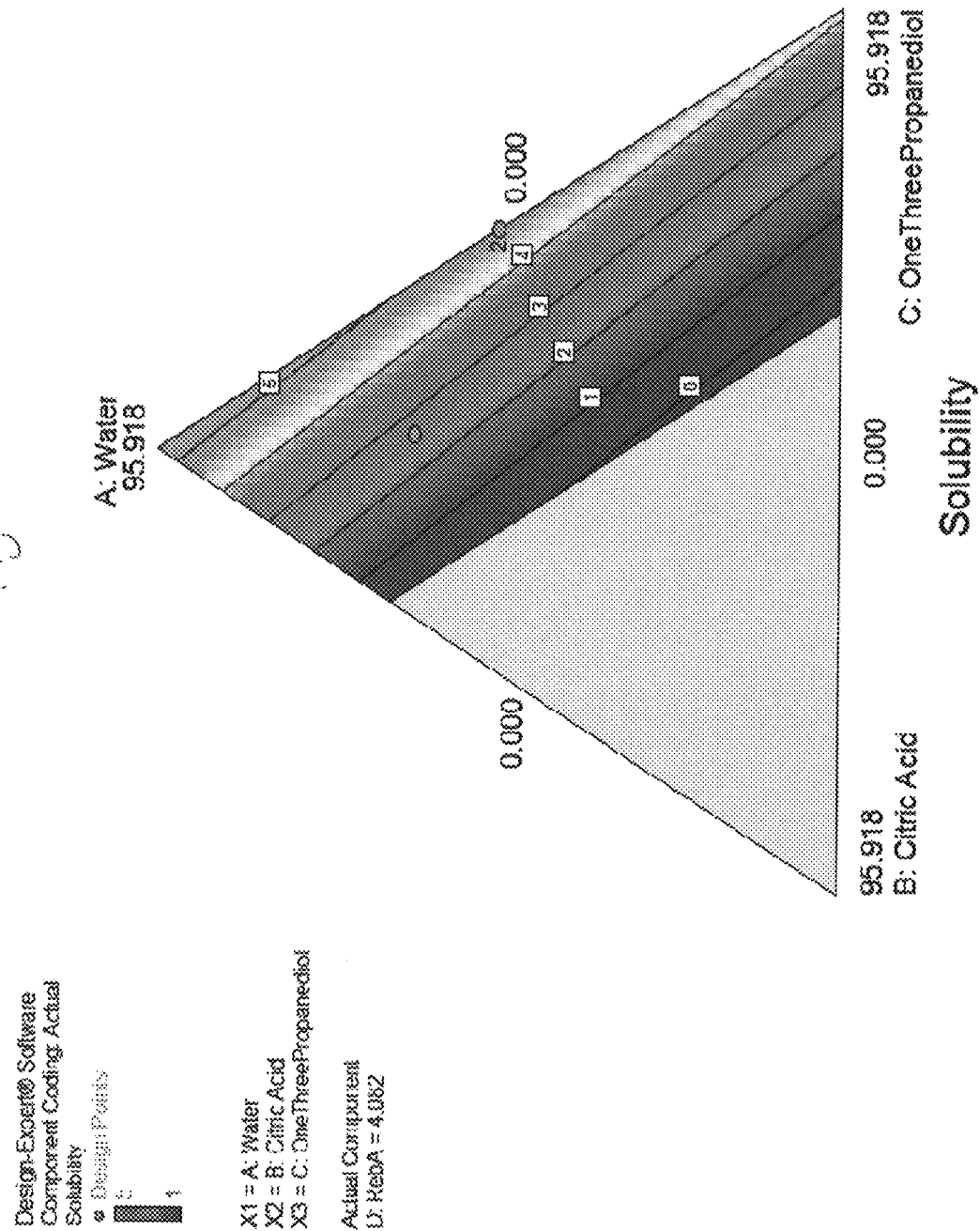
Figure 7:
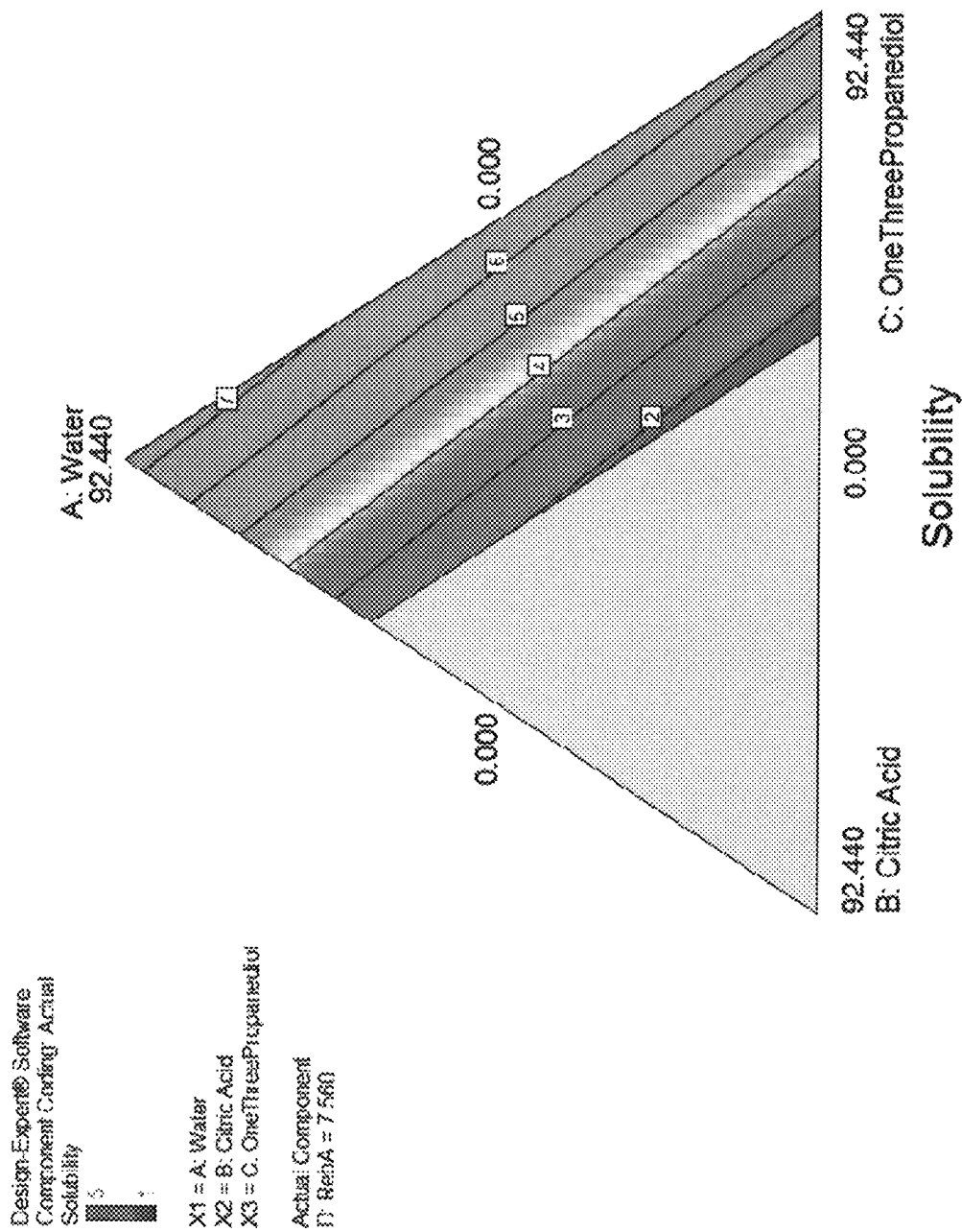
Figure 8:
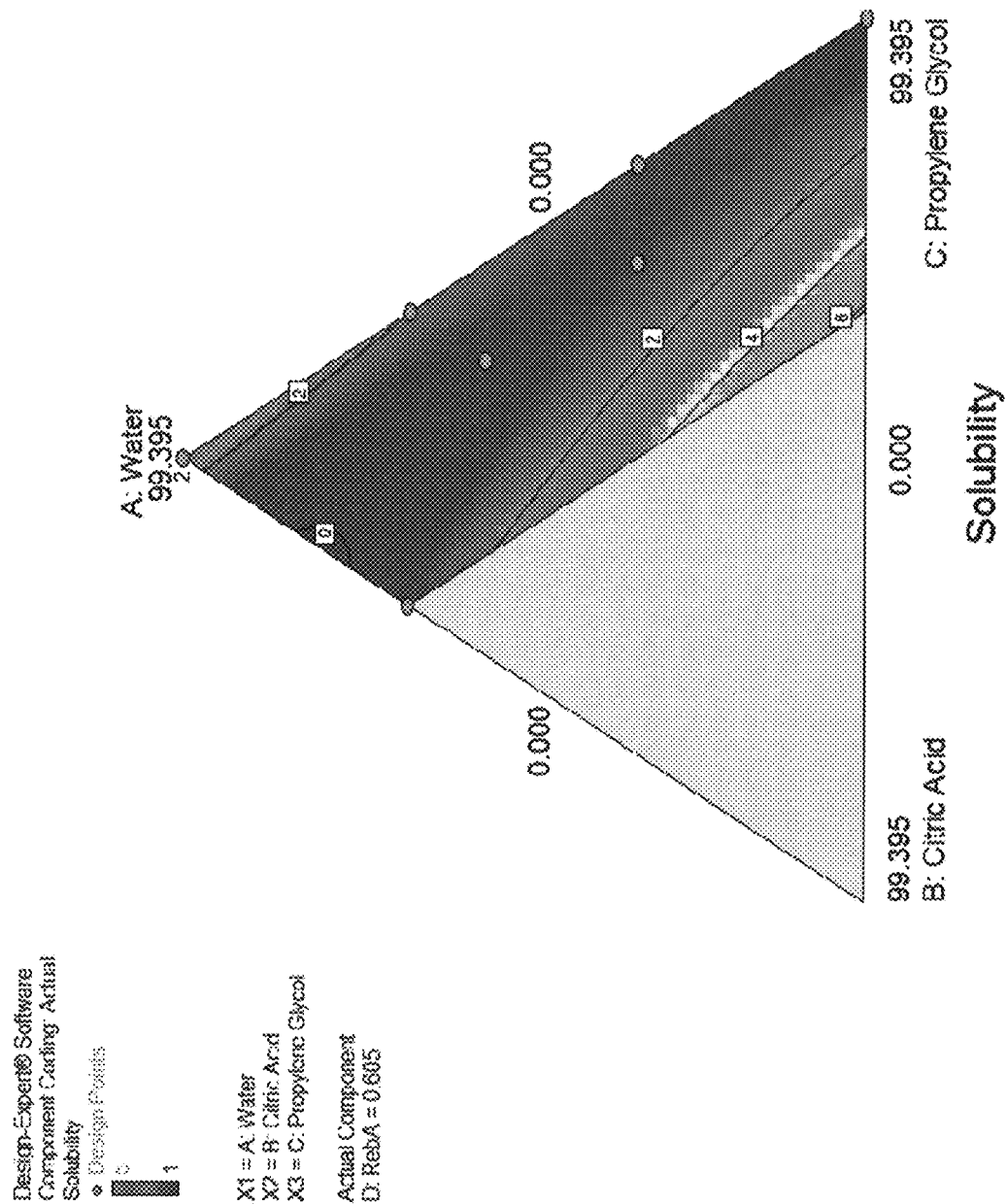
Figure 9:
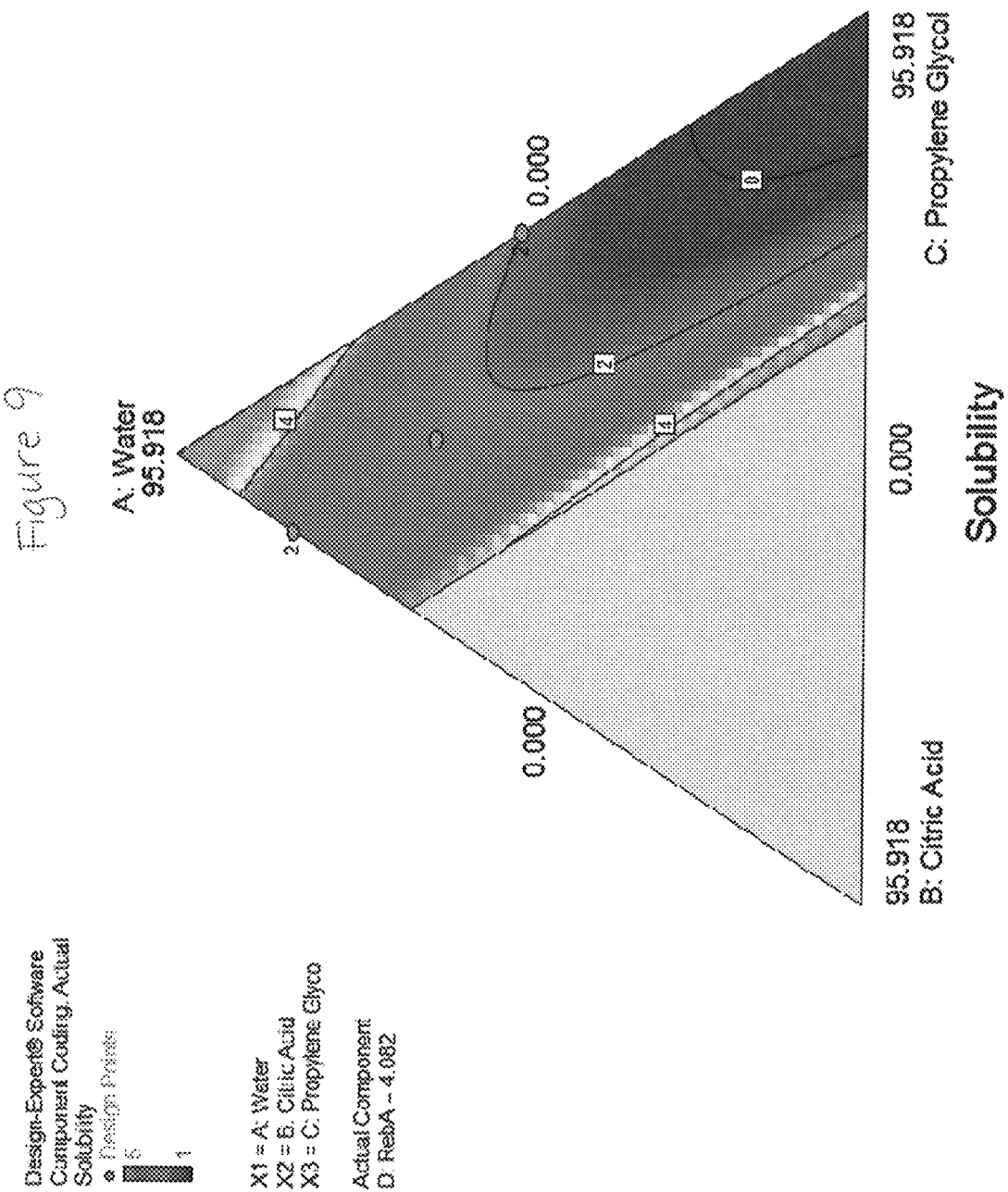
Figure 10:
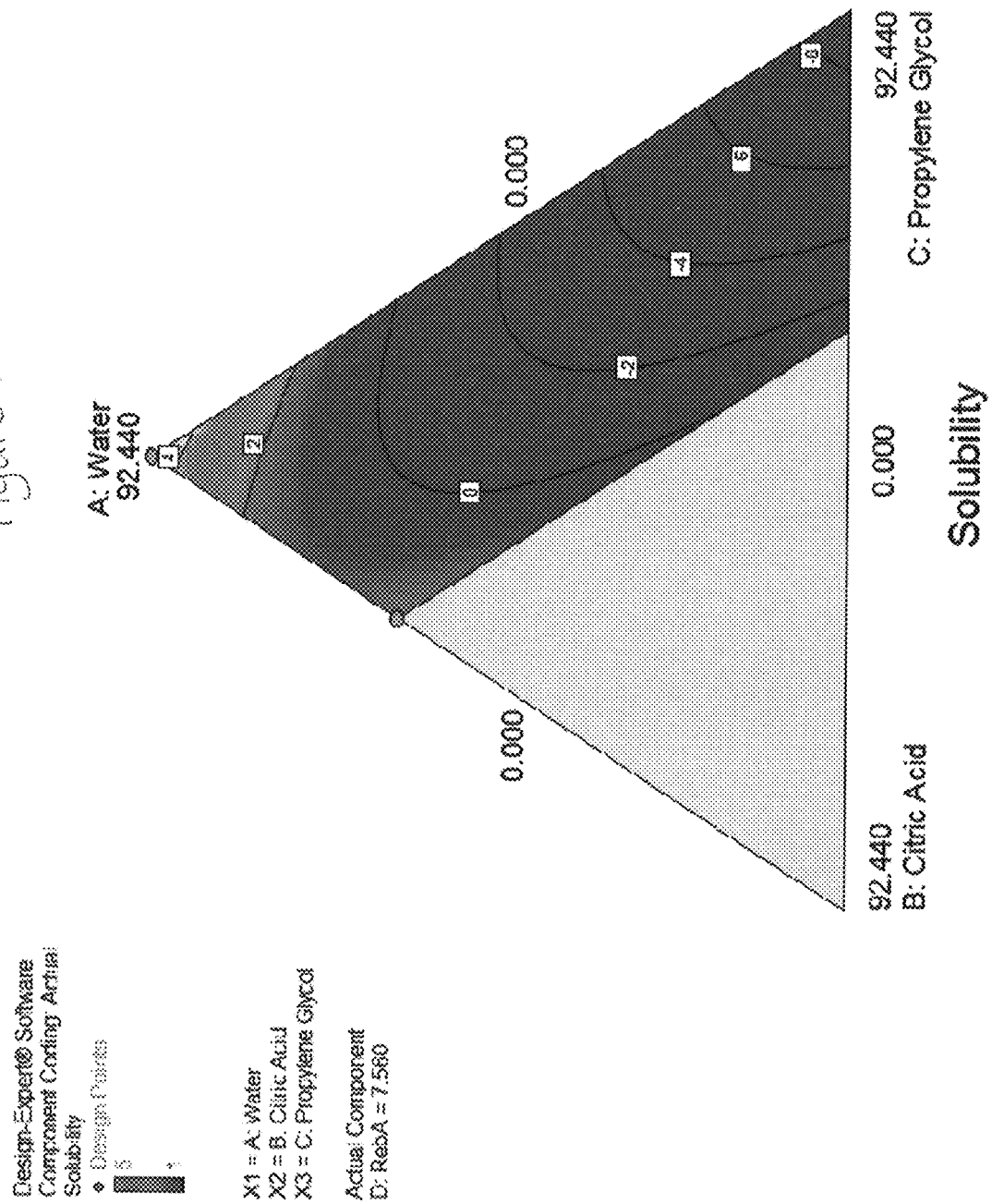
Figure 11:
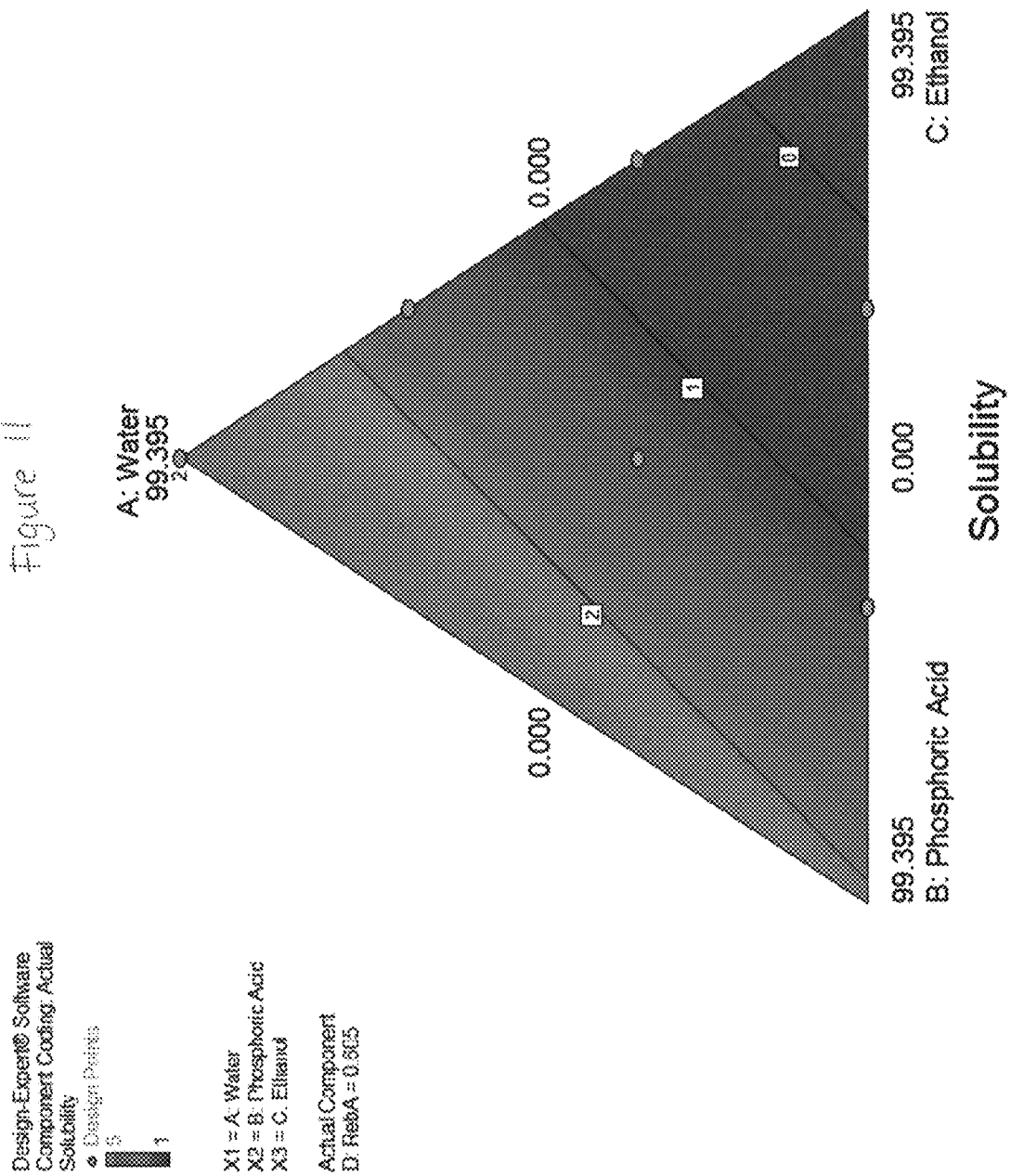
Figure 12:
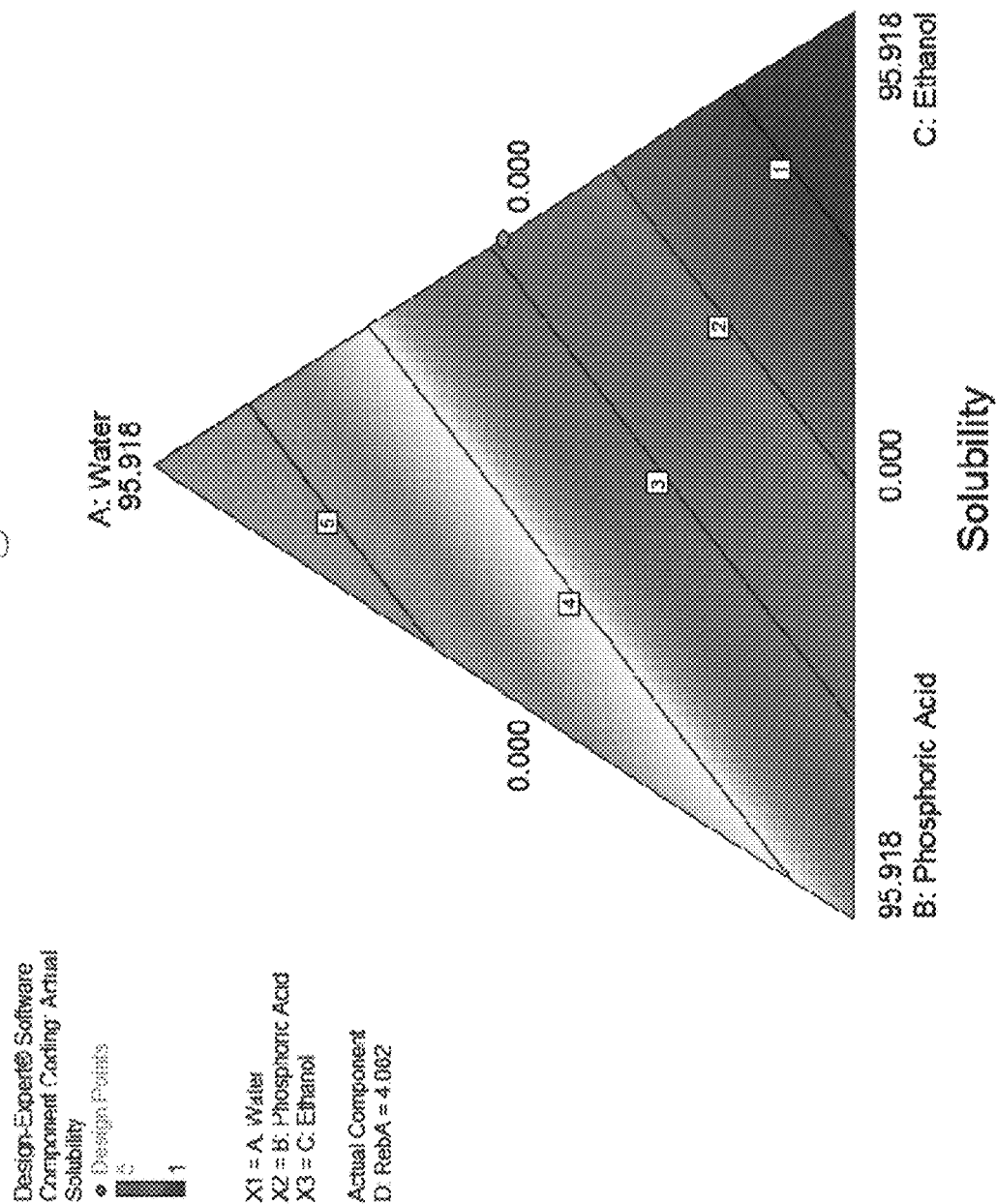
Figure 13:
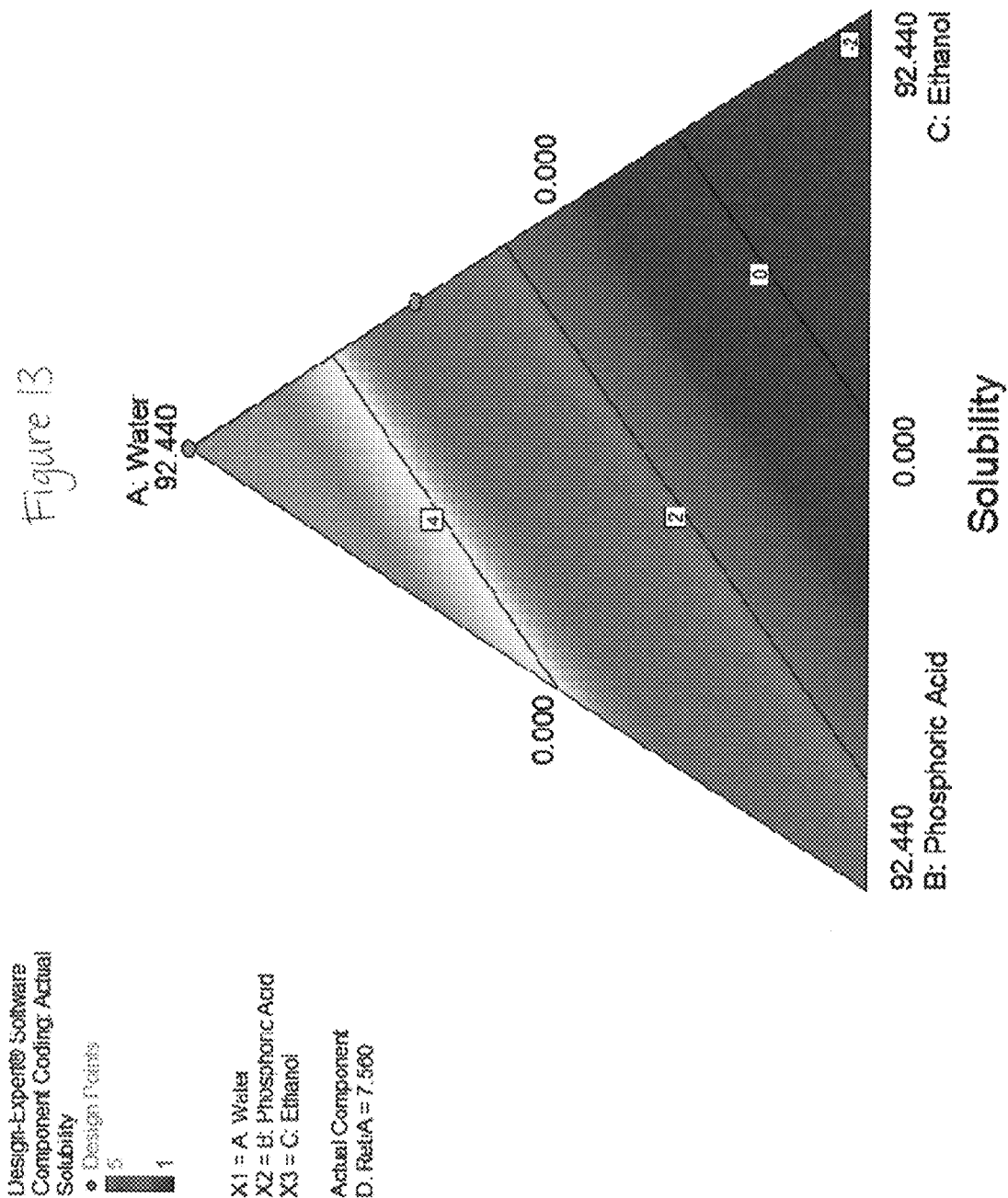
Figure 14:
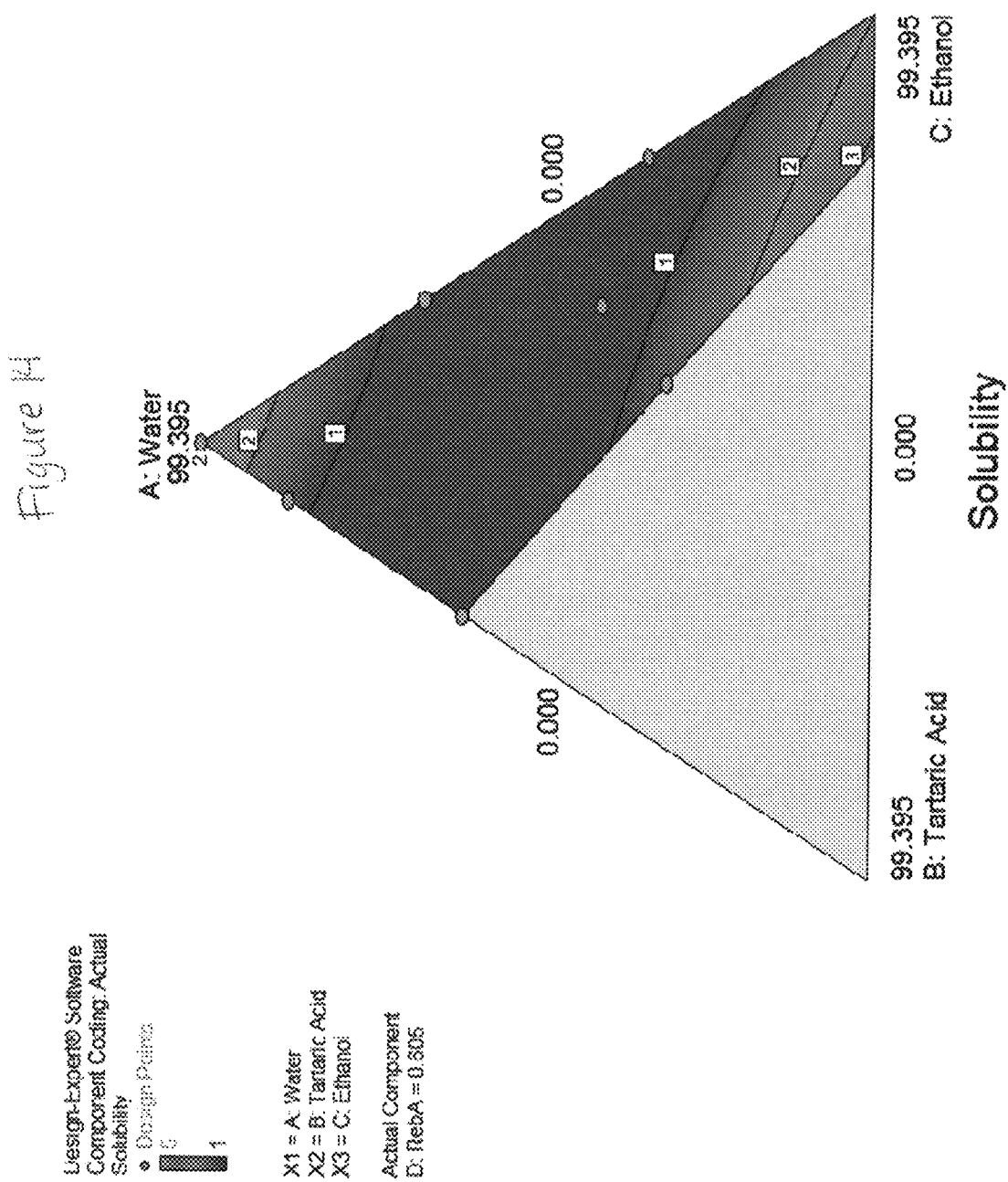
Figure 15:
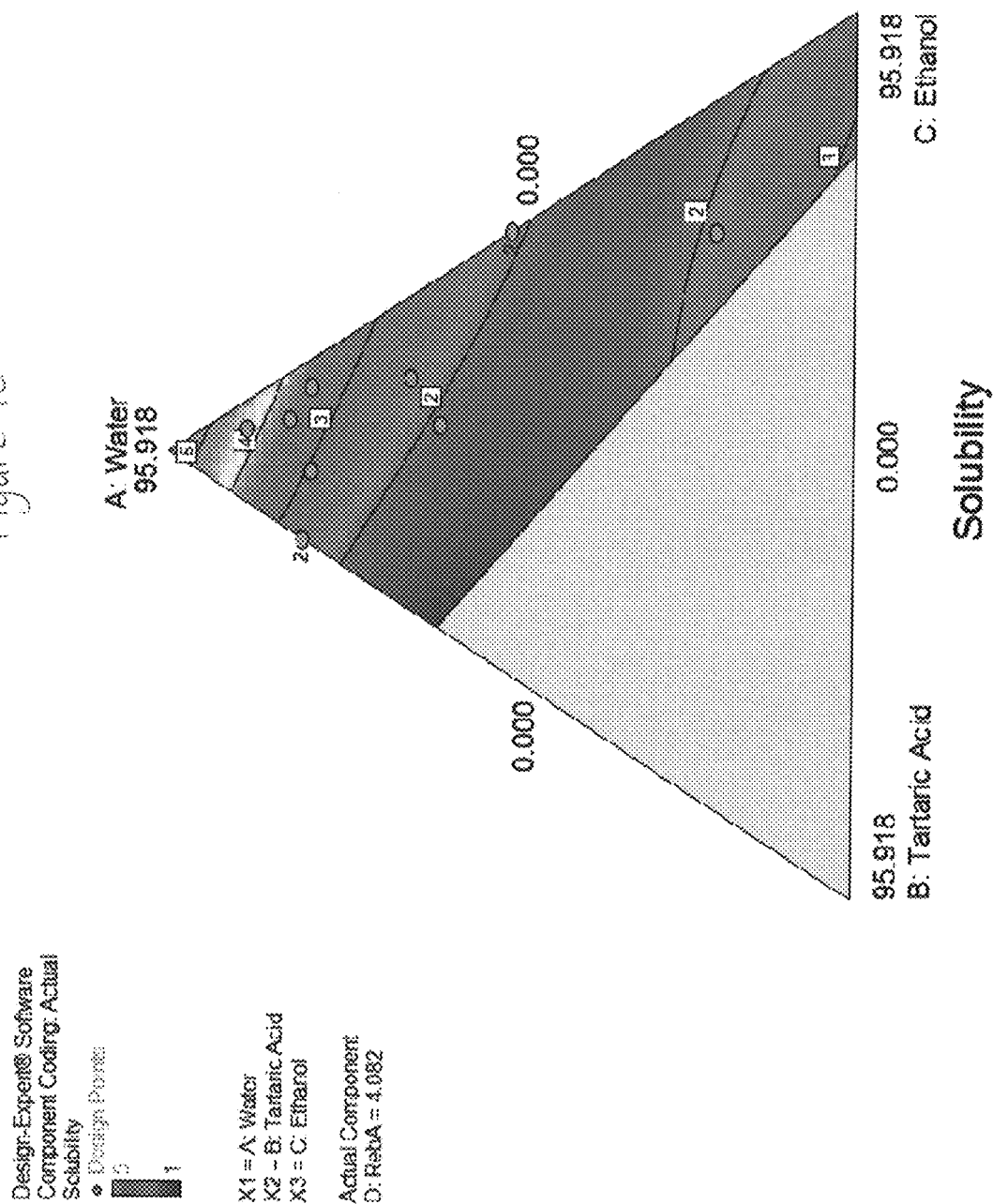
Figure 17:
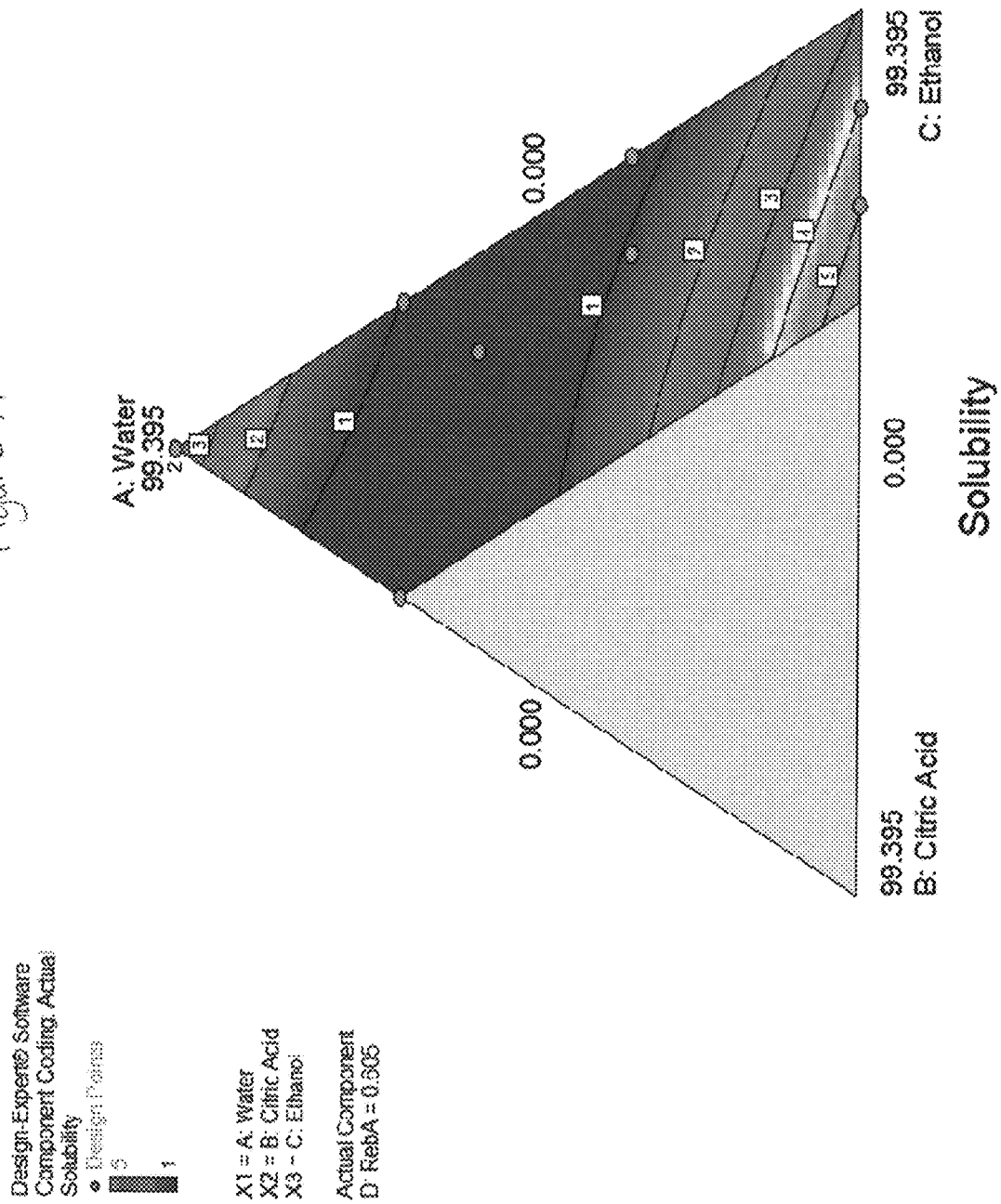
Figure 16:
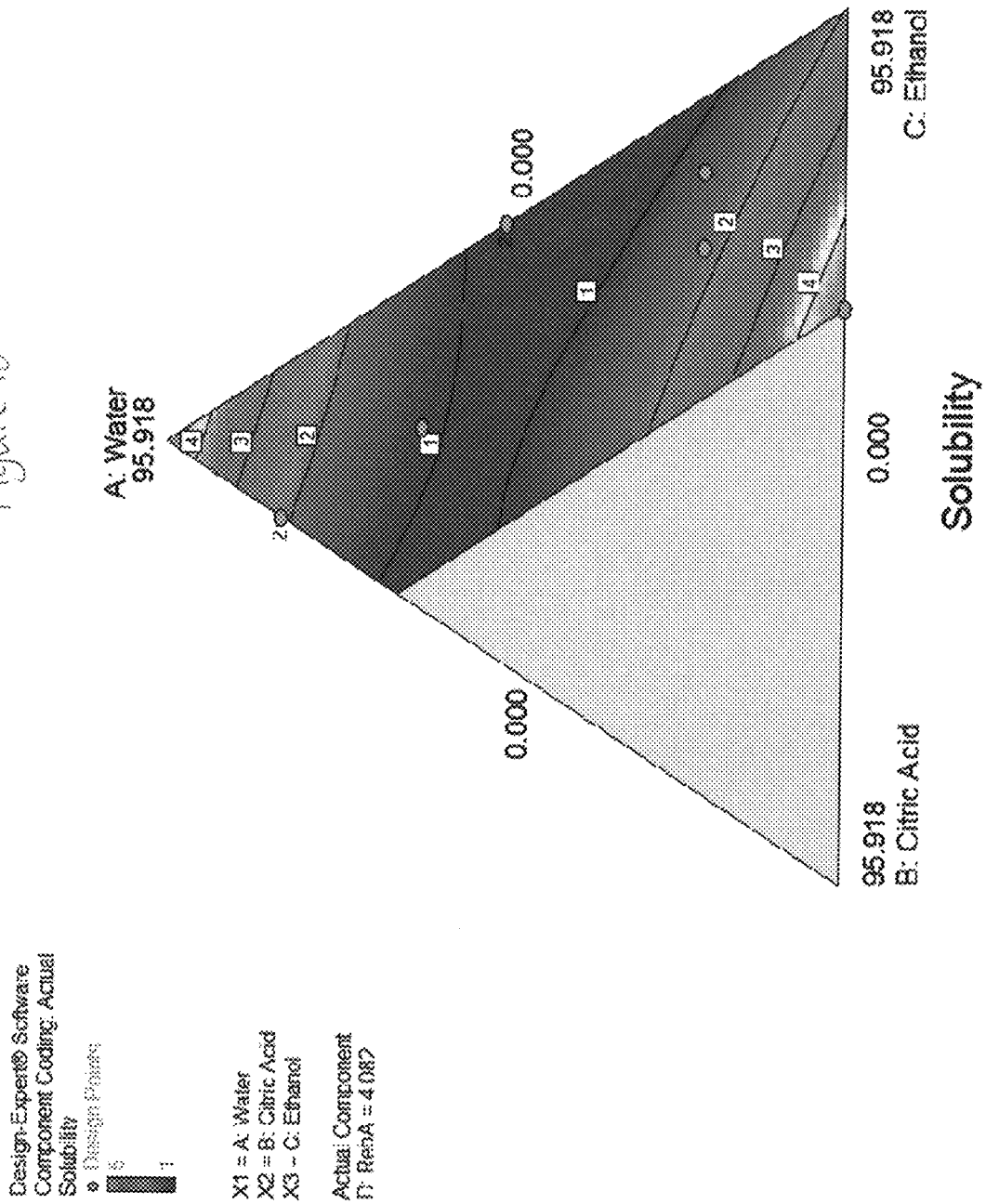

Methods and compositions of the present invention relate to food compositions that include one or more solvents and one or more sweeteners. In some embodiments, the food composition may also include an acid and/or other additives such as flavorings. Examples of food compositions of the present invention include but are not limited to concentrate solutions such as sweetener formulations and/or flavor enhancers.

The food compositions of the present invention may be formulated to provide a desired solubility of one or more sweeteners in solution for a desired length of time. In some embodiments, formulations and methods of the present invention allow for high concentrations of sweetener, such as for example rebaudioside A, to remain in solution for a desired length of time. For example, in one embodiment, a food composition includes about 500 ppm to about 150,000 ppm rebaudioside A in solution for at least one week to 33 months or longer, without the need for heat or pressure treatment. The solubility may depend on the water activity, the dissolved solids or the blends of solvents in the system into which the sweetener is being placed.

Traditionally it has been a challenge to maintain high concentrations of sweeteners such as steviol glycosides in solution. It has been discovered that certain selections and amounts of components surprisingly allow for higher concentrations of steviol glycosides to remain in solution for longer periods of times. In some embodiments, such solutions include about 5,000 ppm to about 300,000 ppm steviol glycoside; about 1,000 ppm to about 995,000 ppm food grade non-aqueous solvent; with a balance being water. In some embodiments, such solutions include about 5,000 ppm to about 300,000 ppm steviol glycoside; about 100 ppm to about 600,000 ppm acid; with a balance being water. In some embodiments, such solutions include about 5,000 ppm to about 300,000 ppm steviol glycoside; about 500 ppm to about 200,000 ppm of an amphiphilic substance; with a balance being water. In some embodiments, steviol glycoside may be combined in a solution with non-aqueous solvent, acid, amphiphilic substance, additional sweeteners, water and/or other components according to any suitable selection and amounts described in more detail herein.

Sweetener

Food compositions of some embodiments of the present invention include one or more sweeteners. Suitable sweeteners may include natural sweeteners, artificial sweeteners, nutritive sweeteners and/or non-nutritive sweeteners. In some embodiments, a suitable sweetener may include a natural high-potency sweetener. As used herein, the phrase "natural high-potency sweetener" or "NHPS" means any sweetener found in nature which may be in raw, extracted, purified, or any other suitable form, singularly or in combination thereof. An NHPS may characteristically have a sweetness potency greater than sucrose, fructose, or glucose, yet may have fewer calories. Non-limiting examples of NHPSs which may be suitable for embodiments of this invention includes natural high-potency steviol glycoside sweeteners, such as rebaudioside A, rebaudioside B, rebaudioside C, rebaudioside D, rebaudioside E, rebaudioside F, dulcoside A, dulcoside B, rubusoside, stevia, stevioside, and steviolbioside.

In some embodiments, a food composition includes a mixture of stevioside and other steviol glycosides. The stevioside may be present in relation to the other steviol glycosides in the mixture in a ppm ratio (ppm stevioside: ppm other steviol glycosides) of about 1:1 to about 1:1,500; about 1:5 to about 1:1,000; about 1:10 to about 1:750; about 1:20 to about 1:500; about 1:20 to about 1:100; about 1:25 to about 1:500; about 1:50 to about 1:250; about 1:75 to about 1:150; about 1:100 to about 1:125; about 1:1; about 1:10; about 1:25; about 1:50; about 1:75; about 1:100; about 1:125; about 1:150; about 1:175; about 1:200; about 1:250; about 1:300; about 1:350; about 1:400; about 1:450; about 1:500; about 1:550; about 1:600; about 1:650; about 1:700; about 1:750; about 1:800; about 1:850; about 1:900; about 1:950; about 1:1,000; about 1:1,250; or about 1:1,500.

In some embodiments, for example, it was observed that a mixture of steviol glycosides had a lower propensity to crystallize when compared to a more homogenous and pure form of a single steviol glycoside. In some embodiments, for example, it was observed that the solutions containing predominately rebaudioside A had a higher propensity to crystallize whereas when a mixture of steviol glycosides were added to the same solution, it was found that it the propensity to crystallize was delayed or negated altogether. This was particularly observed for steviol glycoside mixtures that contained stevioside, and was observed for solutions that had as little as 100 ppm of stevioside.

The following sweeteners may be added in combination with the steviol glycoside sweeteners: mogroside IV, mogroside V, Luo Han Guo sweetener, fruit or juice, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, and cyclocarioside I.

Alternatively, the raw, extracted, or purified NHPS may be modified. Modified NHPSs are understood to be NHPSs which have been altered naturally or synthetically. For example, a modified NHPS includes, but is not limited to, NHPSs which have been fermented, contacted with enzyme, or derivatized, or the product of any process wherein at least one atom has been added to, removed from, or substituted on the NHPS. In one embodiment, at least one modified NHPS may be used in combination with at least one NHPS. In another embodiment, at least one modified NHPS may be used without a NHPS. Thus, a modified NHPS may be substituted for a NHPS or be used in combination with a NHPS for some of the embodiments described herein. For the sake of brevity, however, in the description of embodiments of this invention, a modified NHPS is not described expressly as an alternative to an unmodified NHPS, but it should be understood that a modified NHPS can be substituted for a NHPS in some embodiments disclosed herein.

In one embodiment, extracts of NHPSs may be used in any purity percentage. In another embodiment, when a NHPS is used as a non-extract, the purity of the NHPS may range, for example, from about 0.5% to about 99%. In some embodiments, a NHPS is at least 95% pure. In another example, the purity of the NHPS (extract or non-extract) may range from about 50% to about 99%; from about 70% to about 99%; from about 80% to about 99%; from about 90% to about 99%; from about 95% to about 99%; from about 95% to about 99.5%; from about 97% to about 100%; from about 98% to about 100%; and from about 99% to about 100%.

Purity, as used here, represents the weight percentage of a respective NHPS compound present in a NHPS extract, in raw or purified form. In one embodiment, a steviolglycoside extract comprises a particular steviolglycoside in a particular purity, with the remainder of the stevioglycoside extract comprising a mixture of other steviolglycosides. To obtain a particularly pure extract of a NHPS, such as rebaudioside A, it may be necessary to purify the crude extract to a substantially pure form. Such methods generally are known to those of ordinary skill in the art.

Suitable artificial sweeteners may include but are not limited to sucralose, acesulfame potassium or other salts, aspartame, alitame, saccharin, neohesperidin dihydrochalcone, cyclamate, neotame, N—[N-[3-(3-hydroxy-4-methoxyphenyl)propyl]-L-a-aspartyl]-L-10 phenylalanine 1-methyl ester, N—[N-[3-(3-hydroxy-4-methoxyphenyl)-3-methylbutyl]-L-a-aspartyl]-L-phenylalanine 1-methyl ester, N—[N-[3-(3-methoxy-4-hydroxyphenyl)propyl]L-a-aspartyl]-L-phenylalanine 1-methyl ester, salts thereof, and the like.

Food compositions of the present invention may include carbohydrate additives/sweeteners such as tagatose, trehalose, galactose, rhamnose, cyclodextrin (e.g., α-cyclodextrin, β-cyclodextrin, γ-cyclodextrin), maltodextrin (including resistant maltodextrins such as Fibersol-2™), dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, amylopectin, glucosamine, mannosamine, fucose, glucuronic acid, gluconic acid, glucono-lactone, abequose, galactosamine, beet oligosaccharides, isomalto-oligosaccharides (isomaltose, isomaltotriose, panose and the like), xylo-oligosaccharides (xylotriose, xylobiose and the like), gentio-oligoscaccharides (gentiobiose, gentiotriose, gentiotetraose and the like), sorbose, nigero-oligosaccharides, palatinose oligosaccharides, fucose, fractooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, or glucose syrup.

Compositions of the present invention may include one or more polyol additive such as erythritol, maltitol, mannitol, sorbitol, lactitol, xylitol, inositol, isomalt, propylene glycol, glycerol (glycerine), threitol, galactitol, palatinose, reduced isomalto-oligosaccharides, reduced xylo-oligosaccharides, reduced gentio-oligosaccharides, reduced maltose syrup, or reduced glucose syrup. In some embodiments, compositions of the present invention may include one or more amino acid additive such as aspartic acid, arginine, glycine, glutamic acid, proline, threonine, theanine, cysteine, cystine, alanine, valine, tyrosine, leucine, isoleucine, asparagine, serine, lysine, histidine, ornithine, methionine, carnitine, aminobutyric acid (alpha-, beta-, and gamma-isomers), glutamine, hydroxyproline, taurine, norvaline, sarcosine, or salts thereof.

In some embodiments, a sweetener may be present in a food composition in an amount of about 1 ppm to about 800,000 ppm; about 5 ppm to about 800,000 ppm; about 100 ppm to about 600,000 ppm; 100 ppm to about 300,000 ppm; 100 ppm to about 275,000 ppm; about 200 ppm to about 250,000 ppm; about 500 ppm to about 225,000 ppm; about 750 ppm to about 200,000 ppm; about 1,000 ppm to about 175,000 ppm; about 1,500 ppm to about 150,000 ppm; about 2,000 ppm to about 150,000 ppm; about 3,000 ppm to about 150,000 ppm; about 4,000 ppm to about 150,000 ppm; about 5,000 ppm to about 150,000 ppm; about 5,000 ppm to about 300,000 ppm; about 7,500 ppm to about 125,000 ppm; about 10,000 ppm to about 100,000 ppm; about 12,500 ppm to about 75,000 ppm; about 15,000 ppm to about 50,000 ppm; 17,500 ppm to about 25,000 ppm; about 1 ppm; about 5 ppm; about 100 ppm; about 200 ppm; about 500 ppm; about 750 ppm; about 1,000 ppm; about 1,500 ppm; about 2,000 ppm; about 3,000 ppm; about 4,000 ppm; about 5,000 ppm; about 7,500 ppm; about 10,000 ppm; about 12,500 ppm; about 15,000 ppm; about 17,500 ppm; about 20,000 ppm; about 50,000 ppm; about 75,000 ppm; about 100,000 ppm; about 125,000 ppm; about 150,000 ppm; about 175,000 ppm; about 200,000 ppm; about 225,000 ppm; about 250,000 ppm; about 275,000 ppm; about 300,000 ppm; about 400,000 ppm; about 500,000 ppm; about 600,000 ppm; about 700,000 ppm; or about 800,000 ppm.

In some embodiments, a suitable sweetener includes rebaudioside A. Rebaudioside A may take various forms. In some embodiments, the form of the rebaudioside A affects its solubility. For example, some processed NHPS (e.g., rebaudioside A) may include potential seed crystals. The seed crystals may include, for example, undissolved crystals of rebaudioside A that accelerate the re-crystallization process of the NHPS from solution. In some embodiments, the seed crystals have a needle-like form. In one embodiment, removing such potential seed crystals (e.g., by methods such as heating the solution to solubilize the crystals, by filtering or other separation techniques) increases the solubility of the rebaudioside A.

In some embodiments, methods of the present invention include increasing the solubility of NHPS, for example, in water. In one embodiment of the method, increasing the solubility of NHPS includes removing crystals of a selected type from NHPS. While not wishing to be bound by theory, removal of potential seed crystals may prevent and/or inhibit the crystallization process by reducing and/or removing the nucleation sites for the process to occur. Also there may be less crystallization occurring in mixed glycoside solutions due the fact that similar molecules may act to inhibit the orderly arranging that occurs in highly homogenous concentrations of molecules. In one embodiment of the method, removing the selected crystals includes blending NHPS (e.g., rebaudioside A) with a solvent (e.g., water) and centrifuging the mixture to induce the separation of crystals and removing the crystals. In some embodiments, the solution may be heated to temperatures sufficient to solubilize all of the seed crystals. Sufficient temperatures may include ambient temperature; about 33° F. to about 68° F.; about 68° F. to about 74° F.; greater than about 74° F.; about 74° F. to about 300° F.; about 130° F. to about 300° F.; or about 150° F. to about 180° F. Ambient is understood to mean a temperature of about 68° F. to about 77° F.

In some embodiments, methods of increasing the solubility of NHPS include spray-drying. In some embodiments, rebaudioside A may be completely dissolved in water, for example, by mixing until the solution is clear. In some embodiments, the spray-drying solution may include rebaudioside A in an amount of about 5 wt % to about 50 wt % of the solution; about 5 wt % to about 40 wt % of the solution; about 5 wt % to about 35 wt % of the solution; about 5 wt % to about 30 wt % of the solution; about 5 wt % to about 25 wt % of the solution; about 10 wt % to about 20 wt % of the solution; about 5 wt % of the solution; about 10 wt % of the solution; about 15 wt % of the solution; about 20 wt % of the solution; about 25 wt % of the solution; about 30 wt % of the solution; about 35 wt % of the solution; about 40 wt % of the solution; about 45 wt % of the solution; or about 50 wt % of the solution. Upon complete dissolution, the solution may be spray dried using standard processing techniques with a spray dryer such as, for example, a Niro Mobile Minor pilot scale spray dryer.

In some embodiments, the method includes filtering to remove potential seed crystals from rebaudioside A. To filter the rebaudioside A, a solution may be prepared by dissolving rebaudioside A in water. The rebaudioside A solution may then be passed through a filter, such as a membrane filtration apparatus attached to a vacuum source. An example of a suitable filter may include 0.45 micron pore size, 47 mm diameter filter from Gelman Sciences. Once the rebaudioside A solution passes through the filter, the filter may be removed and weighed. In some embodiments, the filter will collect the undissolved rebaudioside A.

Acid

In some embodiments, food compositions of the present invention include an acid. Food compositions may include any suitable acid, including organic and/or inorganic acids. In some embodiments, suitable acids include but are not limited to citric acid, malic acid, tartaric acid and/or phosphoric acid. Suitable organic acid additive salts include, but are not limited to, sodium, calcium, potassium, and magnesium salts of all organic acids, such as salts of citric acid, malic acid, tartaric acid, fumaric acid, lactic acid (e.g., sodium lactate, mono calcium phosphate, mono sodium phosphate, mono potassium phosphate, mono calcium citrate, mono sodium citrate and mono potassium citrate), alginic acid (e.g., sodium alginate), ascorbic acid (e.g., sodium ascorbate), benzoic acid (e.g., sodium benzoate or potassium benzoate), carbonic acid, and adipic acid. In some embodiments, the above-referenced organic acids optionally may be substituted with one or more moieties such as hydrogen, alkyl, alkenyl, alkynyl, halo, haloalkyl, carboxyl, acyl, acyloxy, amino, amido, carboxyl derivatives, alkylamino, dialkylamino, arylamino, alkoxy, aryloxy, nitro, cyano, sulfo, thiol, imine, sulfonyl, sulfenyl, sulfinyl, sulfamyl, carboxalkoxy, carboxamido, phosphonyl, phosphinyl, phosphoryl, phosphino, thioester, thioether, anhydride, oximino, hydrazino, carbamyl, phospho, phosphonato, or any other viable functional group provided the substituted organic acid additives function to acidify the beverage.

Suitable inorganic acid additives for use in embodiments of this invention may include, but are not limited to, phosphoric acid, phosphorous acid, polyphosphoric acid, hydrochloric acid, sulfuric acid, sodium acid sulfate, potassium acid sulfate, sodium acid pyrophosphate, sodium dihydrogen phosphate, and their corresponding alkali or alkaline earth metal salts thereof (e.g., inositol hexaphosphate Mg/Ca).

In some embodiments, the presence of an acid in food compositions of the present invention increases the solubility of a sweetener in the solvent. In certain embodiments, the amount of acid in a food composition may be selected based on the affect the presence of the acid will have on the solubility of one or more sweeteners in the solvent of the food composition. In some embodiments, a food composition includes an amount of acid which enables the one or more sweeteners to remain in solution in the solvent of the food composition for a desired length of time. In some embodiments, a food composition includes an amount of acid which will provide a desired pH. In some embodiments, a food composition has a desired pH of about 1.8 to about 4.0; about 1.8 to about 3.0; about 1.7 to about 1.8; about 1.8 to about 1.9; about 1.9 to about 2.0; about 2.0 to about 2.1; about 2.0 to about 3.0; about 2.0 to about 2.7; about 2.1 to about 2.2; about 2.2 to about 2.3; about 2.3 to about 2.4; about 2.4 to about 2.5; about 2.5 to about 2.6; about 2.6 to about 2.7; about 2.7 to about 2.8; about 2.8 to about 2.9; about 2.9 to about 3.0; about 3.0 to about 3.1; about 3.1 to about 3.2; about 0.5 to about 13; about 1.2 to about 4.2; about 0.5; about 1; about 1.5; about 2; about 2.5; about 3; about 3.5; about 4; about 4.5; about 5; about 5.5; about 6; about 6.5; about 7; about 7.5; about 8; about 8.5; about 9; about 9.5; about 10; about 10.5; about 11; about 11.5; about 12; about 12.5; or about 13.

Food compositions of some embodiments of the present invention may include acid in an amount of about 100 ppm to about 800,000 ppm; about 500 ppm to about 775,000 ppm; about 1,000 ppm to about 750,000 ppm; about 4,000 ppm to about 725,000 ppm; about 5,000 ppm to about 700,000 ppm; about 6,000 ppm to about 675,000 ppm; about 7,000 ppm to about 650,000 ppm; about 8,000 ppm to about 625,000 ppm; about 9,000 ppm to about 600,000 ppm; about 10,000 ppm to about 600,000 ppm; about 25,000 ppm to about 575,000 ppm; about 50,000 ppm to about 550,000 ppm; about 100,000 ppm to about 500,000 ppm; about 150,000 ppm to about 450,000 ppm; about 200,000 ppm to about 400,000 ppm; about 250,000 ppm to about 350,000 ppm; about 100 ppm; about 250 ppm; about 500 ppm; about 750 ppm; about 1,000 ppm; about 2,000 ppm; about 3,000 ppm; about 4,000 ppm; about 5,000 ppm; about 6,000 ppm; about 7,000 ppm; about 8,000 ppm; about 9,000 ppm; about 10,000 ppm; about 15,000 ppm; about 25,000 ppm; about 50,000 ppm; about 75,000 ppm; about 100,000 ppm; about 150,000 ppm; about 200,000 ppm; about 250,000 ppm; about 300,000 ppm; about 350,000 ppm; about 400,000 ppm; about 450,000 ppm; about 500,000 ppm; about 550,000 ppm; about 600,000 ppm; about 650,000 ppm; about 700,000 ppm; about 750,000 ppm; or about 800,000 ppm.

Alcohol

In some embodiments of the present invention, a food composition includes one or more alcohols. In some embodiments, the presence of an alcohol in food compositions of the present invention increases the solubility of a sweetener in the solvent. In certain embodiments, the amount of alcohol in a food composition may be selected based on the affect the presence of the alcohol will have on the solubility of one or more sweeteners in the solvent of the food composition. In some embodiments, a food composition includes an amount of alcohol which enables the one or more sweetener to remain in solution in the solvent of the food composition for a desired length of time.

Any suitable alcohol may be used in embodiments of the present invention, such as but not limited to water and/or alcohols such as ethanol, propylene glycol, benzyl alcohol and glycerine. In some embodiments, a food composition includes alcohol in an amount of about 0.10 wt % to about 99 wt % of the composition; about 0.1 wt % to about 0.25 wt % of the composition; about 0.1 wt % to about 0.5 wt % of the composition; about 0.1 wt % to about 0.75 wt % of the composition; about 0.1 wt % to about 1 wt % of the composition; about 0.1 wt % to about 2 wt % of the composition; about 0.1 wt % to about 3 wt % of the composition; about 0.1 wt % to about 4 wt % of the composition; about 0.1 wt % to about 5 wt % of the composition; about 0.1 wt % to about 6 wt % of the composition; about 0.1 wt % to about 7 wt % of the composition; about 0.1 wt % to about 8 wt % of the composition; about 0.1 wt % to about 9 wt % of the composition; about 0.1 wt % to about 10 wt % of the composition; about 0.1 wt % to about 12.5 wt % of the composition; about 0.1 wt % to about 15 wt % of the composition; about 0.1 wt % to about 20 wt % of the composition; about 1 wt % to about 30 wt % of the composition; about 1 wt % to about 40 wt % of the composition; about 1 wt % to about 50 wt % of the composition; about 1 wt % to about 75 wt % of the composition; about 0.1 wt % of the composition; about 0.25 wt % of the composition; about 0.5 wt % of the composition; about 0.75 wt % of the composition; about 1 wt % of the composition; about 2 wt % of the composition; about 3 wt % of the composition; about 4 wt % of the composition; about 5 wt % of the composition; about 6 wt % of the composition; about 7 wt % of the composition; about 8 wt % of the composition; about 9 wt % of the composition; about 10 wt % of the composition; about 12.5 wt % of the composition; about 15 wt % of the composition; about 20 wt % of the composition; about 30 wt % of the composition; about 40 wt % of the composition; about 50 wt % of the composition; about 60 wt % of the composition; about 70 wt % of the composition; about 80 wt % of the composition; about 90 wt % of the composition; or about 99 wt % of the composition.

In some embodiments of the present invention, a food composition includes 1,3-propanediol. In some embodiments, a food composition includes 1,3-propanediol in an amount of about 15 wt % to about 99 wt % of the composition; about 25 wt % to about 75 wt % of the composition; about 40 wt % to about 60 wt % of the composition; about 15 wt % of the composition; about 25 wt % of the composition; about 40 wt % of the composition; about 50 wt % of the composition; about 60 wt % of the composition; about 75 wt % of the composition; or about 99 wt % of the composition.

Solvent

Food compositions of some embodiments of the invention include one or more solvents. Any suitable solvent may be used, such as but not limited to water, ethanol, propylene glycol, 1,3 propanediol, triacetin, ethyl acetate, benzyl alcohol, glycerin, and combinations thereof.

In some embodiments, the food composition includes one or more food grade non-aqueous solvent such as ethanol, propylene glycol, 1,3-propanediol, triacetin, ethyl acetate, benzyl alcohol, glycerin, and combinations thereof.

In some embodiments, a food composition includes a non-aqueous solvent in an amount of about 500 ppm to about 995,000 ppm; about 1,000 ppm to about 995,000; about 1,000 ppm to about 950,000 ppm; about 1,000 ppm to about 900,000 ppm; about 1,000 ppm to about 850,000 ppm; about 1,000 ppm to about 800,000 ppm; about 1,000 ppm to about 750,000 ppm; about 1,000 ppm to about 700,000 ppm; about 1,000 ppm to about 650,000 ppm; about 1,000 ppm to about 600,000 ppm; about 1,000 ppm to about 550,000 ppm; about 1,000 ppm to about 500,000 ppm; about 1,000 ppm to about 450,000 ppm; about 1,000 ppm to about 400,000 ppm; about 1,000 ppm to about 350,000 ppm; about 1,000 ppm to about 300,000 ppm; about 1,000 ppm to about 250,000 ppm; about 1,000 ppm to about 200,000 ppm; about 1,000 ppm to about 150,000 ppm; about 1,000 ppm to about 100,000 ppm; about 1,000 ppm to about 50,000 ppm; about 1,500 ppm to about 25,000 ppm; about 2,000 ppm to about 15,000 ppm; about 3,000 ppm to about 10,000 ppm; about 500 ppm; about 1,000 ppm; about 1,500 ppm; about 2,000 ppm; about 3,000 ppm; about 5,000 ppm; about 7,500 ppm; about 10,000 ppm; about 15,000 ppm; about 25,000 ppm; about 50,000 ppm; about 100,000 ppm; about 150,000 ppm; about 200,000 ppm; about 250,000 ppm; about 300,000 ppm; about 350,000 ppm; about 400,000 ppm; about 450,000 ppm; about 500,000 ppm; about 550,000 ppm; about 600,000 ppm; about 650,000 ppm; about 700,000 ppm; about 750,000 ppm; about 800,000 ppm; about 850,000 ppm; about 900,000 ppm; about 950,000 ppm; or about 995,000 ppm.

In some embodiments, food compositions may include solvents such as the alcohols described in the Alcohol section above, and in the amounts described therein.

Amphiphilic Molecules

It has been found that a group of substances that have amphiphilic physical properties may be able to prevent and reverse crystallization of steviol glycosides in a composition. While not wishing to be bound by theory, the effectiveness of these substances may depend on many variables, such as the substance's solubility and polarity. The effectiveness may also be dependent on the purity of the individual steviol glycosides, the solvents, and the environmental conditions in which the system is made.

In some embodiments, amphiphilic molecules can inhibit or delay stevia crystallization. For example, in some embodiments, hexanoic acid can inhibit crystallization of stevia. Amphiphilic molecules such as hexanoic acid may be added to the solution as their pure or close to pure forms or they can also be added as a component of a larger molecule such as, but is not limited to, a triglyceride, diglyceride, monoglyceride, lactone, or sucrose ester. Sucrose esters, for example, can break down in a low-pH beverage product into sucrose and fatty acids. A fatty acid such as a hexanoic acid may not have functionality initially within the sucrose ester, but after the sucrose ester breaks down, the hexanoic acid may gain functionality and then be able to prevent crystallization. In some cases, larger molecules like triglyceride, diglyceride, monoglyceride, or sucrose ester may have functionality to prevent crystallization, depending on the amphiphilic molecule within the larger molecule.

The amphiphilic substances may contain one or more of the following functional groups: terminal carboxylic acid, terminal alpha, beta, or gamma-hydroxyl acids, terminal aldehyde, and/or penultimate ketone. These substances may be branched or unbranched, and saturated or unsaturated, and they may contain at least one aromatic group.

The terminal carboxylic acid molecules can have a carbon chain length of about 2 to about 21; about 3 to about 20; about 4 to about 19; about 5 to about 18; about 6 to about 17; about 7 to about 16; about 8 to about 15; about 9 to about 14; about 10 to about 13; about 11 to about 12; about 2; about 4; about 6; about 8; about 10; about 12; about 14; about 16; about 18; about 20; or about 21. In some embodiments, the carboxylic acid may include, for example, acetic acid, propionic acid, butanoic acid, pentanoic acid, hexanoic acid, heptanoic acid, octanoic acid, nonanoic acid, decanoic acid, and combinations thereof.

The terminal alpha, beta, or gamma-hydroxyl acids molecules can have a carbon chain length of about 2 to about 21; about 3 to about 20; about 4 to about 19; about 5 to about 18; about 6 to about 17; about 7 to about 16; about 8 to about 15; about 9 to about 14; about 10 to about 13; about 11 to about 12; about 2; about 4; about 6; about 8; about 10; about 12; about 14; about 16; about 18; about 20; or about 21. In some embodiments, the alpha-hydroxy acid may include, for example, lactic acid.

The terminal alcohol molecules can have a carbon chain length of about 2 to about 21; about 3 to about 20; about 4 to about 19; about 5 to about 18; about 6 to about 17; about 7 to about 16; about 8 to about 15; about 9 to about 14; about 10 to about 13; about 11 to about 12; about 2; about 4; about 6; about 8; about 10; about 12; about 14; about 16; about 18; about 20; or about 21. In some embodiments, the terminal alcohol molecules may include, for example, ethanol, benzyl alcohol 1-proponal, 1-butanol, isobutanol, phenethyl alcohol, and combinations thereof.

The terminal aldehyde molecules can have a carbon chain length of about 2 to about 21; about 3 to about 20; about 4 to about 19; about 5 to about 18; about 6 to about 17; about 7 to about 16; about 8 to about 15; about 9 to about 14; about 10 to about 13; about 11 to about 12; about 2; about 4; about 6; about 8; about 10; about 12; about 14; about 16; about 18; about 20; or about 21.

The penultimate ketone molecules can have a carbon chain length of about 2 to about 21; about 3 to about 20; about 4 to about 19; about 5 to about 18; about 6 to about 17; about 7 to about 16; about 8 to about 15; about 9 to about 14; about 10 to about 13; about 11 to about 12; about 2; about 4; about 6; about 8; about 10; about 12; about 14; about 16; about 18; about 20; or about 21.

Examples of suitable amphiphilic substances include but are not limited to lactic acid, terpineol, benzyl alcohol, 1-butanol, 1-proponol, propionic acid, caprylic acid, 2-methoxyphenol, butyric acid, hexanoic acid, isobutanol, 2-ethylpyrazine, 2-methylthiol 3 methyl pyrazine, benzaldehyde, pentanoic acid, 3-methyl, butyl 1 lactate, valeric acid, 2 mercaptopropinic acid, 4-allyl-2-methoxyphenol, phenyl acetic acid, phenethyl alcohol, 2-methoxy-4-[1-propen-1-yl]phenol, 9 decenoic acid, 5 & 6 decenoic acid, 1-octanol, 1-decanol, hexyl alcohol, and combinations thereof.

A food composition may include an amphiphlic substance in an amount of about 100 ppm to about 250,000 ppm; about 500 ppm to about 200,000 ppm; about 750 ppm to about 150,000 ppm; about 1,000 ppm to about 100,000 ppm; about 1,000 ppm to about 200,000 ppm; about 1,500 ppm to about 75,000 ppm; about 2,500 ppm to about 50,000 ppm; about 5,000 ppm to about 25,000 ppm; about 7,500 ppm to about 10,000 ppm; about 100 ppm; about 500 ppm; about 750 ppm; about 1,000 ppm; about 1,500 ppm; about 2,500 ppm; about 5,000 ppm; about 7,500 ppm. about 10,000 ppm; about 25,000 ppm; about 50,000 ppm; about 75,000 ppm; about 100,000 ppm; about 150,000 ppm; about 200,000 ppm; or about 250,000 ppm.

Additional Components

In some embodiments, food compositions of the present invention may include additional components to achieve the desired final product. For example, liquid concentrates may include flavorings, preservatives, coloring, vitamins, electrolytes, minerals, herbs, spices, proteins, amino acids, peptides and fortification.

Food compositions may include any suitable flavoring, including but not limited to acerola, apple, berries, caffeine, caja, cashew, cola, chocolate, grape, grapefruit, graviola, guava, hibiscus, horchata, lemon, lemonade, lime, mandarin, mango, melon, orange, orange-banana, orange-banana-strawberry, orange-grapefruit-lime, orange-mango, orange-papaya, orange-strawberry-kiwi, passion fruit, peach, pear, pear-banana, pineapple, pineapple-coconut, seriguela, spice, strawberry, sweet orange, tamarind, tangerine, tea, tea extract, tuna, cactus, fig, vanilla, and watermelon.

Food compositions may include any suitable coloring, including FDA certified coloring as well as colorings exempt from certification.

Food compositions may include any suitable preservative, including but not limited to potassium sorbate, sodium sorbate, citrus extracts, potassium benzoate, sodium benzoate, sodium hexa-meta-phosphate, EDTA, nisin, natamycin, polylysine or any other natural or artificial preservative(s).

Solution

Food compositions of some embodiments of the present invention may be in the form of a solution. Desired ingredients of the food composition may be added to the solvent under agitation, which in some embodiments promotes solubility. In some embodiments, a preservative is added to the solvent prior to addition of an acid.

In some embodiments, desired ingredients may be combined when the solvent is at ambient temperature; at a temperature of about 33° F. to about 68° F.; about 68° F. to about 75° F.; greater than about 75° F.; about 130° F. to about 300° F.; or about 150° F. to about 180° F. In some embodiments, desired ingredients are combined when the solvent is at a temperature sufficient to solubilize any crystals in a NHPS included in the composition. In some embodiments, adding a sweetener to a heated solvent may increase the solubility of the sweetener.

In some embodiments, selection and combination of components in a solution may prevent steviol glycoside crystallization from occurring in solutions but may not reverse crystallization which has already occurred. Examples of these embodiments can include but are not limited to compositions with levels of food grade acidulants such as citric acid, malic acid, tartaric acid, phosphoric etc. As the amount of acid is increased, the probability of steviol glycoside crystallization is decreased. Filtering the steviol glycoside solutions may have the same effect. As pore size is decreased, the probability of steviol glycoside crystallization is decreased. The effectiveness of these components on preventing crystallization is dependent on many variables, which may include but are not limited to the substance's solubility and polarity. The effectiveness may also be dependent on the purity of the individual steviol glycosides, the solvents, and the environmental conditions in which the solution is made.

In other embodiments, selection and combination of components in a solution may prevent and reverse steviol glycoside crystallization from occurring in solutions. Examples of these embodiments are compositions containing substances that have amphiphilic physical properties, such as certain fatty acids and certain alcohols. At certain concentrations, these substances can fully reverse steviol glycoside crystallization that has already occurred. The effectiveness of these substances may be dependent on many variables, which include but are not limited to the substance's solubility and polarity. The effectiveness may also be dependent on the purity of the individual steviol glycosides, the solvents, and the environmental conditions in which the system is made.

In some embodiments, the food composition may be formulated to sustain solubility of the one or more sweeteners in the solvent for at least 1 week, 1 month; at least 2 months; at least 3 months; at least 4 months; at least 5 months; at least 6 months; at least 7 months; at least 8 months; at least 9 months; at least 10 months; at least 11 months; at least 12 months; at least 13 months; at least 14 months; at least 15 months; at least 16 months; at least 17 months; at least 18 months; at least 27 months, at least 33 months; at least 2 years; at least 2.5 years, or at least 3 years. In some embodiments, food compositions allow for the one or more sweetener to be kept in solution without the need for any heat or pressure treatment. In some embodiments, formulations according to embodiments of the present invention allow for higher concentrations of sweetener to remain in solution as compared to formulations without the combinations of components as described herein.

In some embodiments, solubility of the one or more sweeteners in solution may be quantified by centrifugation and light transmission analysis. An example of a suitable apparatus includes the LUMiSizer (Dispersion Analyser LUMiSizer 610 [S/N 6102-126, 12 Channels). In some embodiments, to quantify the solubility, 400 microliters of solution containing the one or more sweeteners is placed into a 2 mm polycarbonate (PC) cell manufactured by LUM (LUM, 2 mm, PC, Rect. Synthetic Cell [110-131xx]. The solution is most preferably added prior to crystallization. The cycle configuration parameters should be set at 4000 rpm, 300 profiles, 10 interval, 25 degrees Celsius, and a light factor of 1.

At the end of the test, a pellet of sweetener crystals may form in the cell and the volume of the pellet can be approximately quantified based on the differences in light absorbance throughout the sample. To calculate the volume of crystals in solution, the location of the air to solution and the solution to pellet interfaces must be determined. In most cases, a crystal-free supernatant and a crystalline pellet will have final light transmissions of approximately 90 and 5%, respectively. As an example, the air to solution and the solution to pellet interfaces may be located at positions 110 mm and 119 mm of the PC cell, respectively. It is known that the sample is measured at the bottommost part of the PC cell or position 130 mm. With this, it can be determined that positions 119 to 130 mm is the crystalline pellet (i.e. 11 mm total) and positions 110 to 119 mm is the supernatant (i.e. 9 mm total). The total volume of the sample (supernatant plus crystalline pellet) is measured to be 20 mm (positions 110 to 130 mm). The percent volume of crystalline pellet is calculated by dividing the volume of crystalline pellet by the total volume (11 mm divided by 20 mm) and for this example is 55%.

The solubility of the one or more sweeteners may be quantified on a scale of 1-5 based on the size of the pellet. Using this LUMiSizer method, the following rating scale was developed as follows: solubility of 1 may be represented by 0% volume by volume (v/v) of pellet, a solubility of 2 may be represented by trace to 1% v/v of pellet, a solubility of 3 may be represented by 1% to 5% v/v of pellet, a solubility of 4 may be represented by 5% to 30% v/v of pellet, and a solubility of 5 or greater may be represented by 30% or greater v/v of pellet.

Figure 20:
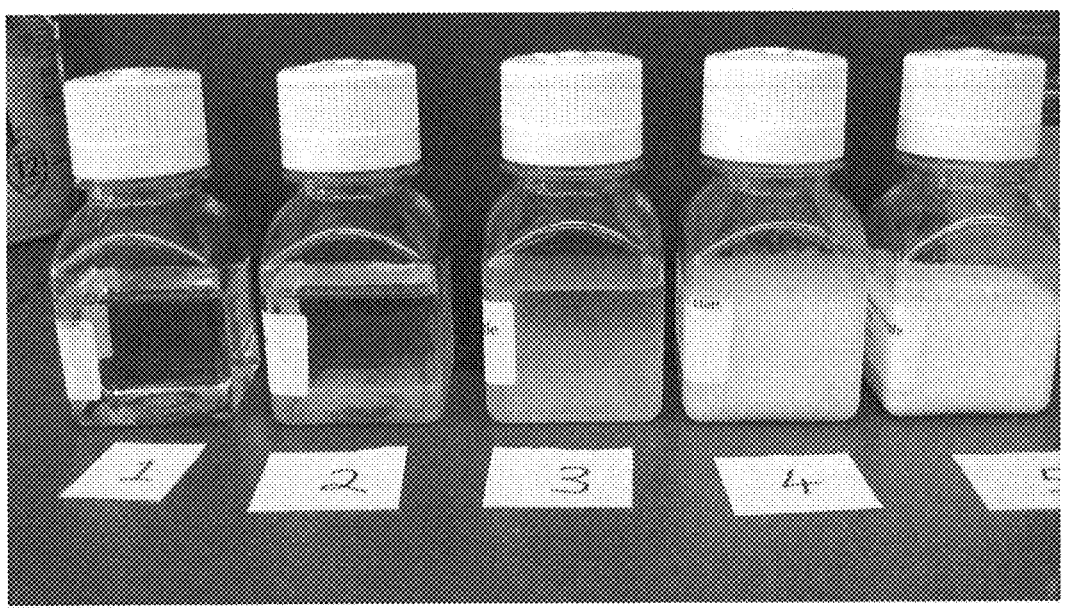
FIG. 20 shows a solubility scale for food compositions of embodiments of the present invention.

In cases where samples have suspended solids such as fiber or cocoa solids a visual observation may be used to evaluated the degree of crystallization. FIG. 20 demonstrates a visual grading system.

In some embodiments, solubility of the one or more sweetener in solution is a function of the amounts of each of the components in the solution, such as solvent, acid, alcohol and sweetener. In some embodiments, solubility of the one or more sweeteners in solution can be determined or described as a function of the amounts of each of the components by examining the solubility of the one or more sweetener while varying amounts of each component.

In some embodiments, food compositions of the present invention may be a concentrate such as a sweetener formulation and/or flavor enhancer. For example, a food composition may be a concentrate that may be reconstituted in a range from about 1 part concentrate added to 5 parts water to about 1 part concentrate added to about 180 parts water; about 1 part concentrate added to 5 parts water to about 1 part concentrate added to about 150 parts water; about 1 part concentrate added to 10 parts water to about 1 part concentrate added to about 140 parts water; about 1 part concentrate added to 20 parts water to about 1 part concentrate added to about 130 parts water; about 1 part concentrate added to 30 parts water to about 1 part concentrate added to about 120 parts water; about 1 part concentrate added to 40 parts water to about 1 part concentrate added to about 110 parts water; about 1 part concentrate added to 50 parts water to about 1 part concentrate added to about 100 parts water; about 1 part concentrate added to 60 parts water to about 1 part concentrate added to about 90 parts water; about 1 part concentrate added to 70 parts water to about 1 part concentrate added to about 80 parts water; about 1 part concentrate added to 5 parts water; about 1 part concentrate added to about 10 parts water; about 1 part concentrate added to 20 parts water; about 1 part concentrate added to about 30 parts water; about 1 part concentrate added to 40 parts water; about 1 part concentrate added to about 50 parts water; about 1 part concentrate added to 60 parts water; about 1 part concentrate added to about 70 parts water; about 1 part concentrate added to 80 parts water; about 1 part concentrate added to about 90 parts water; about 1 part concentrate added to 100 parts water; about 1 part concentrate added to about 110 parts water; about 1 part concentrate added to 120 parts water; about 1 part concentrate added to about 130 parts water; about 1 part concentrate added to 140 parts water; about 1 part concentrate added to about 150 parts water; about 1 part concentrate added to 160 parts water; about 1 part concentrate added to about 170 parts water; about 1 part concentrate added to 180 parts water; about 1 part concentrate added to about 190 parts water; or about 1 part concentrate added to about 200 parts water. It is understood that in some embodiments, such reconstitution ranges are applicable to liquids other than water as well.

The reconstitution ratio of concentrates of some embodiments of the present invention may be determined based on the desired brix level of the end product. Brix equivalency referred to herein is based on sucrose brix (where one degree brix or 1 brix level corresponds to 1 gram of sucrose in 100 grams of aqueous solution). Reconstitution of concentrates of some embodiments of the present invention according to the reconstitution ratios disclosed herein may produce a brix level of about 2 to about 25 brix or brix equivalency; about 2 to about 20 brix or brix equivalency; about 2 to about 15 brix or brix equivalency; about 4 to about 10 brix or brix equivalency; about 2 brix or brix equivalency; about 4 brix or brix equivalency; about 6 brix or brix equivalency; about 8 brix or brix equivalency; about 10 brix or brix equivalency; about 12 brix or brix equivalency; about 14 brix or brix equivalency; about 16 brix or brix equivalency; about 18 brix or brix equivalency; about 20 brix or brix equivalency; or about 25 brix or brix equivalency.

EXAMPLES

Example 1

Various amounts of water, alcohol, steviol glycosides (SG-95 manufactured by PureCircle), and acids were combined to prepare a liquid concentrate. The liquid concentrates were stored at room temperature for one week and were then evaluated for solubility on a scale of 1-5 as shown in FIG. 20, where a solubility of 1 is a crystal clear solution, solubility of 2 shows some haze, solubility of 3 appears hazy, solubility of 4 appears hazy with some particles, and a solubility of 5 is all particles.

The solubility results are shown in the table below, and are plotted in FIG. 1.

| Ratio of Sweetener | | Grams of Sweetener | Grams of Sweetener | Water * Rating | Water, Acid ** Rating | Water, Ethanol *** Rating | Water, Acid and Ethanol **** Rating |
|---|---|---|---|---|---|---|---|
| SG-95 | Reb A | SG 95 | Reb A | | | | |
| N/A | N/A | 0 | 0.44 | 1 | 1 | 1 | 1 |
| N/A | N/A | 0 | 0.88 | 2 | 1 | 1 | 1 |
| N/A | N/A | 0 | 1.32 | 5 | 2 | 2 | 1 |
| N/A | N/A | 0 | 1.76 | 5 | 3 | 2 | 2 |
| N/A | N/A | 0 | 2.2 | 5 | 3 | 3 | 2 |
| N/A | N/A | 0 | 2.64 | 5 | 4 | 3 | 2 |
| N/A | N/A | 0 | 3.08 | 5 | 4 | 4 | 2 |
| N/A | N/A | 0 | 3.52 | 5 | 4 | 5 | 3 |
| N/A | N/A | 0 | 3.96 | 5 | 5 | 5 | 4 |
| N/A | N/A | 0 | 4.4 | 5 | 5 | 5 | 4 |
| 100 | 0 | 4.4 | 0 | 1 | 1 | 1 | 1 |
| 90 | 10 | 3.96 | 0.44 | 1 | 1 | 1 | 1 |
| 80 | 20 | 3.52 | 0.88 | 1 | 1 | 1 | 1 |
| 70 | 30 | 3.08 | 1.32 | 1 | 1 | 1 | 1 |
| 60 | 40 | 2.64 | 1.76 | 1 | 1 | 1 | 1 |
| 50 | 50 | 2.2 | 2.2 | 2 | 1 | 1 | 1 |
| 40 | 60 | 1.76 | 2.64 | 3 | 1 | 1.5 | 1 |
| 30 | 70 | 1.32 | 3.08 | 3 | 2 | 2 | 1 |
| 20 | 80 | 0.88 | 3.52 | 5 | 2.5 | 3 | 2 |
| 10 | 90 | 0.44 | 3.96 | 5 | 4 | 4 | 2 |
| 0 | 100 | 0 | 4.4 | 5 | 5 | 5 | 4 |

| Variant Type | Composition |
|---|---|
| * | 100 grams of Water and Specified Amount of Sweetener |
| ** | 100 grams of Water, 22 grams of Citric Acid and Specified Amount of Sweetener |

-continued

| Ratio of Sweetener | | Grams of Sweetener | | Water Rating* | Water, Acid Rating** | Water, Ethanol Rating*** | Water, Acid and Ethanol Rating**** |
|---|---|---|---|---|---|---|---|
| SG-95 | Reb A | SG 95 | Reb A | | | | |

\* \* \*  90 grams of Water, 10 grams of Ethanol, and Specified Amount of Sweetener
\* \* \* \*  90 grams of Water, 10 grams of Ethanol, 22 grams of Citric Acid and Specified Amount of Sweetener The results demonstrate that a liquid concentrate according to embodiments of the present invention including sweeteners in combination with an alcohol and an acid sustain solubility levels of 1 or 2 at significantly higher concentrations of rebaudioside A than concentrates which do not include all of these components in combination.

Example 2

Liquid concentrate formulations were prepared including varying levels of rebaudioside A, water, alcohol, and acid. The solubility was measured at various concentrations of each of the components and the results are included in the tables below:

| Component-1 A: Water Pure Water Added mL | Component 2 B: Citric Acid ml | Component 3 C: Ethanol (190 Proof) 190 Proof Ethanol Added ml | Component 4 D: RebA ml | Response 1 Solubility |
|---|---|---|---|---|
| 99.67 | 0.00 | 0.00 | 0.33 | 1 |
| 99.33 | 0.00 | 0.00 | 0.67 | 2 |
| 99.00 | 0.00 | 0.00 | 1.00 | 5 |
| 98.67 | 0.00 | 0.00 | 1.33 | 5 |
| 98.34 | 0.00 | 0.00 | 1.66 | 5 |
| 98.00 | 0.00 | 0.00 | 2.00 | 5 |
| 97.67 | 0.00 | 0.00 | 2.33 | 5 |
| 97.34 | 0.00 | 0.00 | 2.66 | 5 |
| 97.01 | 0.00 | 0.00 | 2.99 | 5 |
| 96.67 | 0.00 | 0.00 | 3.33 | 5 |
| 47.96 | 0 | 47.96 | 4.0824 | 1 |
| 59.56 | 32.88 | 0.00 | 7.5600 | 2 |
| 0.00 | 0 | 92.44 | 7.5600 | 5 |
| 39.71 | 32.88 | 19.85 | 7.5600 | 1 |
| 0.00 | 21.92 | 77.48 | 0.6048 | 1 |
| 59.61 | 16.44 | 19.87 | 4.0824 | 2 |
| 99.40 | 0 | 0.00 | 0.6048 | 3 |
| 19.85 | 32.88 | 39.71 | 7.5600 | 1 |
| 66.26 | 0 | 33.13 | 0.6048 | 1 |
| 36.50 | 24.66 | 36.50 | 2.3436 | 1 |
| 47.96 | 0 | 47.96 | 4.0824 | 1 |
| 92.44 | 0 | 0.00 | 7.5600 | 5 |
| 29.78 | 32.88 | 29.78 | 7.5600 | 1 |
| 19.87 | 16.44 | 59.61 | 4.0824 | 1 |
| 69.57 | 8.22 | 19.87 | 2.3436 | 2 |
| 79.48 | 16.44 | 0.00 | 4.0824 | 3 |
| 33.13 | 0 | 66.26 | 0.6048 | 1 |
| 0.00 | 0 | 99.40 | 0.6048 | 4 |
| 99.40 | 0 | 0.00 | 0.6048 | 3 |
| 0.00 | 0 | 92.44 | 7.5600 | 5 |
| 66.52 | 32.88 | 0.00 | 0.6048 | 4 |
| 19.87 | 8.22 | 67.83 | 4.0824 | 1 |
| 19.87 | 24.66 | 49.65 | 5.8212 | 1 |
| 33.13 | 10.96 | 55.30 | 0.6048 | 1 |
| 49.65 | 24.66 | 19.87 | 5.8212 | 1 |
| 0.00 | 32.88 | 63.04 | 4.0824 | 4 |
| 79.48 | 16.44 | 0.00 | 4.0824 | 3 |
| 55.30 | 10.96 | 33.13 | 0.6048 | 1 |
| 0.00 | 10.96 | 88.44 | 0.6048 | 1 |
| 41.95 | 10.28 | 41.95 | 5.82 | 1 |
| 30.81 | 13.70 | 47.93 | 7.56 | 1 |
| 47.93 | 13.70 | 30.81 | 7.56 | 2 |
| 71.89 | 20.55 | 0.00 | 7.56 | 3 |
| 34.23 | 41.10 | 17.11 | 7.56 | 1 |
| 54.82 | 41.10 | 0.00 | 4.08 | 1 |
| 0.00 | 13.70 | 78.74 | 7.56 | Insoluble |
| 0.00 | 27.40 | 69.68 | 2.92 | Insoluble |
| 19.43 | 41.10 | 38.86 | 0.60 | Insoluble |
| 0.00 | 41.10 | 51.34 | 7.56 | Insoluble |
| 0.00 | 41.10 | 58.30 | 0.60 | Insoluble |
| 25.67 | 41.10 | 25.67 | 7.56 | Insoluble |

| Component-1 Water mL | Component 2 B: Malic Acid ml | Component 3 Ethanol (200 Proof) ml | Component 4 D: RebA ml | Response 1 Solubility |
|---|---|---|---|---|
| 99.67 | 0.00 | 0.00 | 0.33 | 1 |
| 99.33 | 0.00 | 0.00 | 0.67 | 2 |
| 99.00 | 0.00 | 0.00 | 1.00 | 5 |
| 98.67 | 0.00 | 0.00 | 1.33 | 5 |
| 98.34 | 0.00 | 0.00 | 1.66 | 5 |
| 98.00 | 0.00 | 0.00 | 2.00 | 5 |
| 97.67 | 0.00 | 0.00 | 2.33 | 5 |
| 97.34 | 0.00 | 0.00 | 2.66 | 5 |
| 97.01 | 0.00 | 0.00 | 2.99 | 5 |
| 96.67 | 0.00 | 0.00 | 3.33 | 5 |
| 47.96 | 0 | 47.96 | 4.0824 | 1 |
| 59.56 | 32.88 | 0.00 | 7.5600 | 1 |
| 39.71 | 32.88 | 19.85 | 7.5600 | 1 |
| 0.00 | 21.92 | 77.48 | 0.6048 | 4 |
| 59.61 | 16.44 | 19.87 | 4.0824 | 1 |
| 99.40 | 0 | 0.00 | 0.6048 | 3.5 |
| 19.85 | 32.88 | 39.71 | 7.5600 | 4 |
| 66.26 | 0 | 33.13 | 0.6048 | 1 |
| 36.50 | 24.66 | 36.50 | 2.3436 | 1 |
| 47.96 | 0 | 47.96 | 4.0824 | 1 |
| 92.44 | 0 | 0.00 | 7.5600 | 5 |
| 29.78 | 32.88 | 29.78 | 7.5600 | 1.5 |
| 19.87 | 16.44 | 59.61 | 4.0824 | 1 |
| 69.57 | 8.22 | 19.87 | 2.3436 | 1 |
| 79.48 | 16.44 | 0.00 | 4.0824 | 2 |
| 33.13 | 0 | 66.26 | 0.6048 | 1 |
| 99.40 | 0 | 0.00 | 0.6048 | 3 |
| 66.52 | 32.88 | 0.00 | 0.6048 | 1 |
| 19.87 | 8.22 | 67.83 | 4.0824 | 1 |
| 19.87 | 24.66 | 49.65 | 5.8212 | 1 |
| 33.13 | 10.96 | 55.30 | 0.6048 | 1 |
| 49.65 | 24.66 | 19.87 | 5.8212 | 1 |
| 0.00 | 32.88 | 63.04 | 4.0824 | 5 |
| 79.48 | 16.44 | 0.00 | 4.0824 | 2 |
| 55.30 | 10.96 | 33.13 | 0.6048 | 1 |
| 0.00 | 10.96 | 88.44 | 0.6048 | 5 |
| 0.00 | 0 | 92.44 | 7.5600 | Insoluble |
| 0.00 | 0 | 99.40 | 0.6048 | Insoluble |
| 0.00 | 0 | 92.44 | 7.5600 | Insoluble |

| Component 1 A: Water ml | Component 2 B: Tartaric Acid ml | Component 3 C: Ethanol (190 Proof) ml | Component 4 D: RebA ml | Response 1 Solubility |
|---|---|---|---|---|
| 99.67 | 0.00 | 0.00 | 0.33 | 1 |
| 99.33 | 0.00 | 0.00 | 0.67 | 2 |
| 99.00 | 0.00 | 0.00 | 1.00 | 5 |
| 98.67 | 0.00 | 0.00 | 1.33 | 5 |
| 98.34 | 0.00 | 0.00 | 1.66 | 5 |
| 98.00 | 0.00 | 0.00 | 2.00 | 5 |
| 97.67 | 0.00 | 0.00 | 2.33 | 5 |
| 97.34 | 0.00 | 0.00 | 2.66 | 5 |
| 97.01 | 0.00 | 0.00 | 2.99 | 5 |
| 96.67 | 0.00 | 0.00 | 3.33 | 5 |
| 49.4338911 | 26.16 | 22.06 | 2.34 | 1 |
| 77.0697916 | 18.85 | 0.00 | 4.08 | 2 |

| Component 1 | Component 2 | Component 3 | Component 4 | Response 1 |
|---|---|---|---|---|
| 18.70369333 | 21.97 | 51.77 | 7.56 | 1 |
| 99.3952 | 0.00 | 0.00 | 0.60 | 2 |
| 33.13173333 | 0.00 | 66.26 | 0.60 | 1 |
| 86.3744288 | 13.02 | 0.00 | 0.60 | 1 |
| 49.51702667 | 12.11 | 30.81 | 7.56 | 1 |
| 47.9588 | 0.00 | 47.96 | 4.08 | 1 |
| 77.0697916 | 18.85 | 0.00 | 4.08 | 2 |
| 47.9588 | 0.00 | 47.96 | 4.08 | 1 |
| 19.2674479 | 14.30 | 62.35 | 4.08 | 2 |
| 99.3952 | 0.00 | 0.00 | 0.60 | 2 |
| 57.8023437 | 16.05 | 22.06 | 4.08 | 1 |
| 33.2952179 | 19.41 | 41.47 | 5.82 | 1 |
| 39.9320216 | 13.74 | 45.72 | 0.60 | 1 |
| 30.1664432 | 27.48 | 41.75 | 0.60 | 1 |
| 92.44 | 0.00 | 0.00 | 7.56 | 5 |
| 66.26346667 | 0.00 | 33.13 | 0.60 | 1 |
| 65.4874479 | 6.63 | 22.06 | 5.82 | 4 |
| 19.2674479 | 6.63 | 71.76 | 2.34 | 2 |
| 37.40738667 | 29.15 | 25.88 | 7.56 | 1 |
| 30.81333333 | 4.93 | 56.70 | 7.56 | 2 |
| 60.3328864 | 39.06 | 0.00 | 0.60 | 1 |
| 68.22072 | 24.22 | 0.00 | 7.56 | 2 |
| 78.92 | 5.00 | 12.00 | 4.08 | 4 |
| 61.92 | 9.00 | 25.00 | 4.08 | 2 |
| 75.92 | 12.00 | 8.00 | 4.08 | 3 |
| 75.92 | 3.00 | 17.00 | 4.08 | 4 |
| 65.18 | 8.00 | 21.00 | 5.82 | 3 |
| 71.18 | 16.00 | 7.00 | 5.82 | 2 |
| 65.44 | 8.00 | 19.00 | 7.56 | 4 |
| 76.18 | 11.00 | 7.00 | 5.82 | 4 |
| 84.92 | 3.00 | 8.00 | 4.08 | 5 |

| Component 1 A: Water ml | Component 2 B: Phosphoric Acid ml | Component 3 C: Ethanol (190 Proof) ml | Component 4 D: RebA ml | Response 1 Solubility |
|---|---|---|---|---|
| 99.67 | 0.00 | 0.00 | 0.33 | 1 |
| 99.33 | 0.00 | 0.00 | 0.67 | 2 |
| 99.00 | 0.00 | 0.00 | 1.00 | 5 |
| 98.67 | 0.00 | 0.00 | 1.33 | 5 |
| 98.34 | 0.00 | 0.00 | 1.66 | 5 |
| 98.00 | 0.00 | 0.00 | 2.00 | 5 |
| 97.67 | 0.00 | 0.00 | 2.33 | 5 |
| 97.34 | 0.00 | 0.00 | 2.66 | 5 |
| 97.01 | 0.00 | 0.00 | 2.99 | 5 |
| 96.67 | 0.00 | 0.00 | 3.33 | 5 |
| 66.26 | 0.00 | 33.13 | 0.60 | 1 |
| 15.99 | 15.99 | 62.21 | 5.82 | 2 |
| 61.63 | 0.00 | 30.81 | 7.56 | 4 |
| 33.13 | 33.13 | 33.13 | 0.60 | 1 |
| 0.00 | 33.13 | 66.26 | 0.60 | 1 |
| 33.13 | 0.00 | 66.26 | 0.60 | 1 |
| 62.21 | 15.99 | 15.99 | 5.82 | 5 |
| 99.40 | 0.00 | 0.00 | 0.60 | 3 |
| 99.40 | 0.00 | 0.00 | 0.60 | 2 |
| 47.96 | 0.00 | 47.96 | 4.08 | 1 |
| 0.00 | 66.26 | 33.13 | 0.60 | 1 |
| 92.44 | 0.00 | 0.00 | 7.56 | 5 |
| 15.99 | 39.10 | 39.10 | 5.82 | 2 |
| 39.10 | 15.99 | 39.10 | 5.82 | 2 |
| 0.00 | 30.81 | 61.63 | 7.56 | Insoluble |
| 15.99 | 62.21 | 15.99 | 5.82 | Insoluble |
| 61.63 | 30.81 | 0.00 | 7.56 | Insoluble |
| 47.96 | 47.96 | 0.00 | 4.08 | Insoluble |
| 0.00 | 0.00 | 99.40 | 0.60 | Insoluble |
| 30.81 | 61.63 | 0.00 | 7.56 | Insoluble |
| 47.96 | 47.96 | 0.00 | 4.08 | Insoluble |
| 0.00 | 47.96 | 47.96 | 4.08 | Insoluble |
| 0.00 | 47.96 | 47.96 | 4.08 | Insoluble |
| 0.00 | 0.00 | 92.44 | 7.56 | Insoluble |
| 0.00 | 92.44 | 0.00 | 7.56 | Insoluble |
| 33.13 | 66.26 | 0.00 | 0.60 | Insoluble |
| 0.00 | 0.00 | 99.40 | 0.60 | Insoluble |
| 0.00 | 99.40 | 0.00 | 0.60 | Insoluble |
| 39.10 | 39.10 | 15.99 | 5.82 | Insoluble |

| Component-1 Water ml | Component 2 B: Citric Acid ml | Component 3 Propylene Glycol ml | Component 4 D: RebA ml | Response 1 Solubility |
|---|---|---|---|---|
| 99.67 | 0.00 | 0.00 | 0.33 | 1 |
| 99.33 | 0.00 | 0.00 | 0.67 | 2 |
| 99.00 | 0.00 | 0.00 | 1.00 | 5 |
| 98.67 | 0.00 | 0.00 | 1.33 | 5 |
| 98.34 | 0.00 | 0.00 | 1.66 | 5 |
| 98.00 | 0.00 | 0.00 | 2.00 | 5 |
| 97.67 | 0.00 | 0.00 | 2.33 | 5 |
| 97.34 | 0.00 | 0.00 | 2.66 | 5 |
| 97.01 | 0.00 | 0.00 | 2.99 | 5 |
| 96.67 | 0.00 | 0.00 | 3.33 | 5 |
| 47.96 | 0 | 47.96 | 4.0824 | 2 |
| 59.56 | 32.88 | 0.00 | 7.5600 | 2 |
| 59.61 | 16.44 | 19.87 | 4.0824 | 2 |
| 99.40 | 0 | 0.00 | 0.6048 | 3 |
| 66.26 | 0 | 33.13 | 0.6048 | 1 |
| 47.96 | 0 | 47.96 | 4.0824 | 2 |
| 92.44 | 0 | 0.00 | 7.5600 | 5 |
| 69.57 | 8.22 | 19.87 | 2.3436 | 3 |
| 79.48 | 16.44 | 0.00 | 4.0824 | 3 |
| 33.13 | 0 | 66.26 | 0.6048 | 1 |
| 0.00 | 0 | 99.40 | 0.6048 | 1 |
| 99.40 | 0 | 0.00 | 0.6048 | 3 |
| 66.52 | 32.88 | 0.00 | 0.6048 | 1 |
| 33.13 | 10.96 | 55.30 | 0.6048 | 1 |
| 49.65 | 24.66 | 19.87 | 5.8212 | 2 |
| 79.48 | 16.44 | 0.00 | 4.0824 | 3 |
| 55.30 | 10.96 | 33.13 | 0.6048 | 1 |
| 0.00 | 0 | 92.44 | 7.5600 | Insoluble |
| 39.71 | 32.88 | 19.85 | 7.5600 | Insoluble |
| 0.00 | 21.92 | 77.48 | 0.6048 | Insoluble |
| 19.85 | 32.88 | 39.71 | 7.5600 | Insoluble |
| 36.50 | 24.66 | 36.50 | 2.3436 | Insoluble |
| 29.78 | 32.88 | 29.78 | 7.5600 | Insoluble |
| 19.87 | 16.44 | 59.61 | 4.0824 | Insoluble |
| 0.00 | 0 | 92.44 | 7.5600 | Insoluble |
| 19.87 | 8.22 | 67.83 | 4.0824 | Insoluble |
| 19.87 | 24.66 | 49.65 | 5.8212 | Insoluble |
| 0.00 | 32.88 | 63.04 | 4.0824 | Insoluble |
| 0.00 | 10.96 | 88.44 | 0.6048 | Insoluble |

| Component-1 Water ml | Component 2 B: Citric Acid ml | Component 3 1-3 Propanediol ml | Component 4 D: RebA ml | Response 1 Solubility |
|---|---|---|---|---|
| 99.67 | 0.00 | 0.00 | 0.33 | 1 |
| 99.33 | 0.00 | 0.00 | 0.67 | 2 |
| 99.00 | 0.00 | 0.00 | 1.00 | 5 |
| 98.67 | 0.00 | 0.00 | 1.33 | 5 |
| 98.34 | 0.00 | 0.00 | 1.66 | 5 |
| 98.00 | 0.00 | 0.00 | 2.00 | 5 |
| 97.67 | 0.00 | 0.00 | 2.33 | 5 |
| 97.34 | 0.00 | 0.00 | 2.66 | 5 |
| 97.01 | 0.00 | 0.00 | 2.99 | 5 |
| 96.67 | 0.00 | 0.00 | 3.33 | 5 |
| 47.96 | 0 | 47.96 | 4.0824 | 4 |
| 59.61 | 16.44 | 19.87 | 4.0824 | 2 |
| 36.50 | 24.66 | 36.50 | 2.3436 | 1 |
| 47.96 | 0 | 47.96 | 4.0824 | 5 |
| 69.57 | 8.22 | 19.87 | 2.3436 | 2 |
| 33.13 | 10.96 | 55.30 | 0.6048 | 1 |
| 49.65 | 24.66 | 19.87 | 5.8212 | 2 |
| 0.00 | 10.96 | 88.44 | 0.6048 | 1 |
| 0.00 | 0 | 92.44 | 7.5600 | Insoluble |
| 29.78 | 32.88 | 29.78 | 7.5600 | Insoluble |
| 19.87 | 16.44 | 59.61 | 4.0824 | Insoluble |
| 19.87 | 8.22 | 67.83 | 4.0824 | Insoluble |
| 19.87 | 24.66 | 49.65 | 5.8212 | Insoluble |
| 0.00 | 32.88 | 63.04 | 4.0824 | Insoluble |

-continued

| Component 1 A: Water ml | Component 2 ACID ml | Component 3 C: Ethanol (190 Proof) ml | Component 4 D: RebA ml | Response 1 Solubility |
|---|---|---|---|---|
| 99.67 | 0.00 | 0.00 | 0.33 | 1 |
| 99.33 | 0.00 | 0.00 | 0.67 | 2 |
| 99.00 | 0.00 | 0.00 | 1.00 | 5 |
| 98.67 | 0.00 | 0.00 | 1.33 | 5 |
| 98.34 | 0.00 | 0.00 | 1.66 | 5 |
| 98.00 | 0.00 | 0.00 | 2.00 | 5 |
| 97.67 | 0.00 | 0.00 | 2.33 | 5 |
| 97.34 | 0.00 | 0.00 | 2.66 | 5 |
| 97.01 | 0.00 | 0.00 | 2.99 | 5 |
| 96.67 | 0.00 | 0.00 | 3.33 | 5 |

The plots in FIGS. 2-19 show that a liquid concentrate according to embodiments of the present invention including rebaudioside A in combination with an alcohol and an acid sustain solubility levels of 1 or 2 at significantly higher concentrations of rebaudioside A than concentrates which do not include all of these components in combination.

Example 3

Several solutions including rebaudioside A were prepared to test the effect of heating and filtering on the solubility of rebaudioside A. The formulations are as follows:

| Key: | | | |
|---|---|---|---|
| | Low Ethanol | 10 | % by volume |
| | Medium Ethanol | 20 | % by volume |
| | High Ethanol | 30 | % by volume |
| | Low Acid | 10 | % by weight |
| | Medium Acid | 20 | % by weight |
| | High Acid | 30 | % by weight |
| | Rebiana Levels: | 5 | % by weight |
| | | 10 | % by weight |
| | | 15 | % by weight |
| | Water Level: | Remaining % per 100 mL | by volume |

| Response: | Description |
|---|---|
| 1 | Crystal clear |
| 2 | Some haze |
| 3 | Hazy |
| 4 | Hazy with particles |
| 5 | All particles |

| Ambient Water with 5 wt % Rebaudioside A | | | | |
|---|---|---|---|---|
| | | Ethanol | | |
| | | Low (L-Et) | Medium (M-Et) | High (H-Et) |
| Acid | Low (L-Ac) | 5 | 5 | 3 |
| | Medium (M-Ac) | 4 | 3 | 2 |
| | High (H-Ac) | 3 | 2 | 1 |
| Ambient Water with 10 wt % Rebaudioside A | | | | |
| | | Ethanol | | |
| | | Low (L-Et) | Medium (M-Et) | High (H-Et) |
| Acid | Low (L-Ac) | N/A* | N/A* | N/A* |
| | Medium (M-Ac) | N/A* | N/A* | N/A* |
| | High (H-Ac) | N/A* | N/A* | 3 |
| Ambient Water with 15 wt % Rebaudioside A | | | | |
| | | Ethanol | | |
| | | Low (L-Et) | Medium (M-Et) | High (H-Et) |
| Acid | Low (L-Ac) | N/A* | N/A* | N/A* |
| | Medium (M-Ac) | N/A* | N/A* | N/A* |
| | High (H-Ac) | N/A* | N/A* | N/A* |

*Not applicable because example using a lower level of Rebaudioside A was observed to be insoluble after 7 days.

| Heated Water with 5 wt % Rebaudioside A | | | | |
|---|---|---|---|---|
| | | Ethanol | | |
| | | Low (L-Et) | Medium (M-Et) | High (H-Et) |
| Acid | Low (L-Ac) | 1 | 1 | 1 |
| | Medium (M-Ac) | 1 | 1 | 1 |
| | High (H-Ac) | 1 | 1 | 1 |
| Heated Water with 10 wt % Rebaudioside A | | | | |
| | | Ethanol | | |
| | | Low (L-Et) | Medium (M-Et) | High (H-Et) |
| Acid | Low (L-Ac) | 1 | 1 | 1 |
| | Medium (M-Ac) | 1 | 1 | 1 |
| | High (H-Ac) | 1 | 1 | 1 |
| Heated Water with 15 wt % Rebaudioside A | | | | |
| | | Ethanol | | |
| | | Low (L-Et) | Medium (M-Et) | High (H-Et) |
| Acid | Low (L-Ac) | 5 | 3 | 1 |
| | Medium (M-Ac) | 1 | 1 | 1 |
| | High (H-Ac) | 1 | 1 | 1 |
| Filtered Reb A/Water Solution, 5 wt % Rebaudioside A | | | | |
| | | Ethanol | | |
| | | Low (L-Et) | Medium (M-Et) | High (H-Et) |
| Acid | Low (L-Ac) | 5 | 1 | 1 |
| | Medium (M-Ac) | 1 | 1 | 1 |
| | High (H-Ac) | 1 | 1 | 1 |

The solutions for the ambient water experimentation were prepared by dissolving rebaudioside A in ambient water (about 68° F. to about 77° F.) using a magnetic stir bar. Citric acid and ethanol were then dissolved into the solution using a magnetic stir bar.

The solutions for the heated water experimentation were prepared by heating water to 150° F. Rebaudioside A was added and dissolved using a magnetic stir bar. The solution was removed from the heat and citric acid was added and dissolved by a magnetic stir bar. After the solution cooled to 100° F. or below, ethanol was added and stirred into the solution by a magnetic stirrer.

The solutions for the filtered rebaudioside A experimentation were prepared by first dissolving rebaudioside A in ambient water (about 68° F. to about 77° F.) using a magnetic stir bar. The solution was then passed through a 0.45 micron filter. Citric acid and ethanol were dissolved into the solution using a magnetic stir bar.

Solubility was measured according to the 1-5 scale in the table above after seven days. Solutions having a solubility of 1 are highlight in the results above.

Using ambient water at 5 wt % rebaudioside A, the rebaudioside A crystallized under all conditions tested except for high ethanol (30% by volume) and high acid (30% by weight). This point failed at 10 wt % rebaudioside A.

Using heated water at 5 wt %, 10 wt %, and 15 wt % rebaudioside A, all points passed at 5 wt % and 10 wt % rebaudioside A, and only the low ethanol (10%)/low acid (10%) and medium ethanol (20%)/low acid failed at 15 wt % rebaudioside A.

Using ambient water and filtering at the 0.45 micron level, all points at 5 wt % rebaudioside A passed except for low acid/low ethanol. The 10 wt % and 15 wt % rebaudioside A levels were not tested due to the filter screen becoming blinded within tenths of a second into filtering.

The results demonstrate overall that the amount of rebaudioside A able to stay in solution is significantly greater when filtering and/or heating techniques are employed. Also, filtered or heating without acid/ethanol is not enough to maintain the metastable, clear system free of crystals.

Example 4

Liquid concentrate formulations were prepared using stevia ingredients from different suppliers. The same level of stevia was used in each sample. A base was made with either alcohol or 1,3-Propanediol and adjusted to either pH2.0 or pH2.5. The samples were kept at 70° F. and 90° F. for 12 weeks and the solubility was measured as defined in sections 46-47. The formulas are included in the tables below:

Bases:

| Ingredient | % | % | % | % |
|---|---|---|---|---|
| Water | 60.46 | 58.22 | 52.8700 | 50.74 |
| Alcohol | 16.05 | 16.05 | 0.00 | 0.00 |
| 1,3-Propanediol | 0.00 | 0.00 | 23.8 | 23.8 |
| CITRIC ACID | 22.40 | 22.40 | 22.4 | 22.4 |
| Potassium Citrate | 1.09 | 3.33 | 0.93 | 3.06 |
| Total | 100.00 | 100.00 | 100.00 | 100.00 |
| pH | 2.0 | 2.5 | 2.0 | 2.5 |

A solution was made of each base with 3% of either RA-80 from Cargill, Alpha® from Pure Circle and Tasteva® from Tate & Lyle. The results are included in the table below.

| Sample 90° F. | Week 2 | Week 4 | Week 6 | Week 8 | Week 10 | Week 12 |
|---|---|---|---|---|---|---|
| pH2.0 1,3-Propanediol Alpha | 2.0 | 2.0 | 2.0 | 2.0 | 2.0 | 2.0 |
| pH2.0 1,3-Propanediol Tasteva | 1.5 | 1.5 | 1.5 | 1.5 | 1.5 | 1.5 |
| pH2.0 1,3-Propanediol RA-80 | 1.5 | 1.5 | 1.5 | 1.5 | 1.5 | 1.5 |
| pH2.5 1,3-Propanediol Alpha | 2.0 | 2.0 | 2.0 | 2.0 | 2.0 | 2.0 |
| pH2.5 1,3-Propanediol Tasteva | 1.5 | 1.5 | 1.5 | 1.5 | 1.5 | 1.5 |
| pH2.5 1,3-Propanediol RA-80 | 1.5 | 1.5 | 1.5 | 1.0 | 1.0 | 1.0 |
| pH2.0 Alcohol Alpha | 1.0 | 1.0 | 1.0 | 1.0 | 1.0 | 1.0 |
| pH2.0 Alcohol Tasteva | 1.0 | 1.0 | 1.0 | 1.0 | 1.0 | 1.0 |
| pH2.0 Alcohol RA-80 | 1.0 | 1.0 | 1.0 | 1.0 | 1.0 | 1.0 |
| pH2.5 Alcohol Alpha | 1.0 | 1.0 | 1.0 | 1.0 | 1.0 | 1.0 |
| pH2.5 Alcohol Tasteva | 1.0 | 1.0 | 1.0 | 1.0 | 1.0 | 1.0 |
| pH2.5 Alcohol RA-80 | 1.0 | 1.0 | 1.0 | 1.0 | 1.0 | 1.0 |

| Sample 70° F. | Week 2 | Week 4 | Week 6 | Week 8 | Week 10 | Week 12 |
|---|---|---|---|---|---|---|
| pH2.0 1,3-Propanediol Alpha | 2.0 | 2.0 | 2.0 | 2.0 | 2.0 | 2.0 |
| pH2.0 1,3-Propanediol Tasteva | 1.5 | 1.5 | 2.0 | 2.5 | 2.5 | 2.5 |
| pH2.0 1,3-Propanediol RA-80 | 1.5 | 1.5 | 1.5 | 1.0 | 1.0 | 1.0 |
| pH2.5 1,3-Propanediol Alpha | 2.0 | 2.0 | 2.0 | 3.0 | 3.0 | 3.0 |
| pH2.5 1,3-Propanediol Tasteva | 1.5 | 1.5 | 1.5 | 2.0 | 2.0 | 2.0 |
| pH2.5 1,3-Propanediol RA-80 | 1.5 | 1.5 | 1.5 | 1.0 | 1.0 | 1.0 |
| pH2.0 Alcohol Alpha | 1.0 | 1.0 | 1.0 | 1.0 | 1.0 | 1.0 |
| pH2.0 Alcohol Tasteva | 1.0 | 1.0 | 1.0 | 1.0 | 1.0 | 1.0 |
| pH2.0 Alcohol RA-80 | 1.0 | 1.0 | 1.0 | 1.0 | 1.0 | 1.0 |
| pH2.5 Alcohol Alpha | 1.0 | 1.0 | 1.0 | 1.0 | 1.0 | 1.0 |
| pH2.5 Alcohol Tasteva | 1.0 | 1.0 | 1.0 | 1.0 | 1.0 | 1.0 |
| pH2.5 Alcohol RA-80 | 1.0 | 1.0 | 1.0 | 1.0 | 1.0 | 1.0 |

Example 5

Various amounts of water, sodium citrate, steviol glycosides (SG-95 manufactured by PureCircle), Rebaudioside A, and Citric Acid were combined to prepare a liquid concentrate. The samples were prepared by the following procedure: Dissolve Rebaudioside A into Water, heat solution to 160 degrees Fahrenheit and hold for 5 minutes, remove solution from heat, add SG-95 (if applicable) and dissolve, cool sample to 100 degrees Fahrenheit, add buffer and dissolve (if applicable), add acid (if applicable) and dissolve. The liquid concentrates were stored at 70 degrees Fahrenheit for one week and were then evaluated for solubility on a scale of 1-5 as defined above.

The solubility results are shown in the table below:

| Sample Type | Variant | SG-95 (grams) | Rebaudioside A [95%] (grams) | Citric Acid (grams) | Sodium Citrate (grams) | Water (grams) | Week 1 |
|---|---|---|---|---|---|---|---|
| Control | C1 | 0 | 5 | 0 | 0 | 100 | 4.5 |
|  |  | 0 | 5 | 0 | 0 | 100 | 4.5 |
|  | C2 | 0 | 5 | 7 | 0 | 100 | 1 |
|  |  | 0 | 5 | 7 | 0 | 100 | 1 |
|  | C3 | 0 | 5 | 7 | 1.2 | 100 | 4.5 |
|  |  | 0 | 5 | 7 | 1.2 | 100 | 4.5 |

-continued

| Sample Type | Variant | SG-95 (grams) | Rebaudioside A [95%] (grams) | Citric Acid (grams) | Sodium Citrate (grams) | Water (grams) | Week 1 |
|---|---|---|---|---|---|---|---|
| SG-95 (1%) | V1 | 0.05 | 5 | 0 | 0 | 100 | 4.5 |
|  |  | 0.05 | 5 | 0 | 0 | 100 | 4.5 |
|  | V2 | 0.05 | 5 | 7 | 0 | 100 | 1 |
|  |  | 0.05 | 5 | 7 | 0 | 100 | 1 |
|  | V3 | 0.05 | 5 | 7 | 1.2 | 100 | 1 |
|  |  | 0.05 | 5 | 7 | 1.2 | 100 | 1 |
| SG-95 (5%) | V4 | 0.25 | 5 | 0 | 0 | 100 | 1 |
|  |  | 0.25 | 5 | 0 | 0 | 100 | 1 |
|  | V5 | 0.25 | 5 | 7 | 0 | 100 | 1 |
|  |  | 0.25 | 5 | 7 | 0 | 100 | 1 |
|  | V6 | 0.25 | 5 | 7 | 1.2 | 100 | 1 |
|  |  | 0.25 | 5 | 7 | 1.2 | 100 | 1 |
| SG-95 (10%) | V7 | 0.5 | 5 | 0 | 0 | 100 | 1 |
|  |  | 0.5 | 5 | 0 | 0 | 100 | 1 |
|  | V8 | 0.5 | 5 | 7 | 0 | 100 | 1 |
|  |  | 0.5 | 5 | 7 | 0 | 100 | 1 |
|  | V9 | 0.5 | 5 | 7 | 1.2 | 100 | 1 |
|  |  | 0.5 | 5 | 7 | 1.2 | 100 | 1 |
| SG-95 (20%) | V10 | 1 | 5 | 0 | 0 | 100 | 1 |
|  |  | 1 | 5 | 0 | 0 | 100 | 1 |
|  | V11 | 1 | 5 | 7 | 0 | 100 | 1 |
|  |  | 1 | 5 | 7 | 0 | 100 | 1 |
|  | V12 | 1 | 5 | 7 | 1.2 | 100 | 1 |
|  |  | 1 | 5 | 7 | 1.2 | 100 | 1 |
| SG-95 (30%) | V13 | 1.5 | 5 | 0 | 0 | 100 | 1 |
|  |  | 1.5 | 5 | 0 | 0 | 100 | 1 |
|  | V14 | 1.5 | 5 | 7 | 0 | 100 | 1 |
|  |  | 1.5 | 5 | 7 | 0 | 100 | 1 |
|  | V15 | 1.5 | 5 | 7 | 1.2 | 100 | 1 |
|  |  | 1.5 | 5 | 7 | 1.2 | 100 | 1 |

The results demonstrate that a liquid concentrate according to embodiments of the present invention including sweeteners in combination with a Steviol Glycosides, Steviol Glycosides and Acid, or Steviol Glycosides, Acid and Buffer sustain solubility levels of 1 at significantly higher concentrations of rebaudioside A than concentrates which do not include all of these components in combination.

Example 6

A liquid concentrate sample was prepared using rebaudioside A from Cargill. Samples were measured for solubility as defined in sections 46-47. The samples were rated as 3 on the scale after 33 months at 35° F. The formula is included in the table below:

| Ingredient | % |
|---|---|
| water | 62.27 |
| Citric Acid | 16.96 |
| Potassium Citrate | 1.4 |
| Flavor (80%-90% Ethanol) | 11 |
| Reb A | 4.4 |
| Malic Acid | 3.89 |
| Shade | 0.08 |
| Total | 100 |

Example 7

Liquid concentrate formulations were prepared using stevia from Pure Circle (Pure Circle Alpha). The same level of stevia was used in each sample. The base was made with room temperature water adding the dry ingredients while gentle mixing the solution until the solution becomes translucent. The samples were kept at 70° F. 1 weeks and the solubility was determined using the visual criteria below. The formulas are included in the tables below:

| Formula for Sample preparation: | |
|---|---|
| Pure Circle Alpha | 4% |
| Citric | 20% |
| K Citrate | 1% |
| Water | 75% |
|  | 100% |

|  | % Flavor 0.25% | % Flavor 0.50% | % Flavor 1.00% | % Flavor 2.00% | % Flavor 4.00% | % Flavor 8% |
|---|---|---|---|---|---|---|
| 1-Butanol | NA | NA | 5 | 5 | 2 | 1 |
| 1-Proponol | NA | NA | 5 | 5 | 4 | 1 |
| Propionic Acid | NA | NA | 5 | 5 | 4 | 1 |
| Caprylic acid C8 | 3 | 2 | 2 | 1 | 1 | 1 |
| Butyric acid C4 | NA | NA | 5 | 5 | 3 | 1 |
| Hexanoic acid C6 | NA | 4 | 3 | 2 | 1 | 1 |
| Isobutanol | NA | NA | 5 | 5 | 3 | 1 |
| Pentanoic acid, 3-methyl- | NA | 5 | 4 | 2 | 1 | 1 |
| Butyl L lactate | NA | NA | 5 | 5 | 2 | 1 |
| Valeric acid | NA | NA | 5 | 2 | 1 | 1 |
| Eugenol | NA | 3 | 2 |  |  | 1 |
| Phenyl Acitic acid | NA | 5 | 4 | 2 | 1 | 1 |
| Phenethyl alcohol | NA | 5 | 3 | 2 | 1 | 1 |
| 9 Decenoic acid | NA | NA | 1 | 1 | 1 | 1 |
| 5 & 6 Decenoic acid | NA | NA | 1 | 1 | 1 | 1 |
| 1-octanol | NA | NA | NA | 2 | 1 | 1 |
| 1-deconol | NA | NA | NA | 1 | 1 | 1 |
| hexyl alcohol | NA | NA | NA | 1 | 1 | 1 |

-continued

| | | | | | | |
|---|---|---|---|---|---|---|
| Ethonal | NA | NA | NA | 5 | 5 | 4 |
| citronellol | NA | NA | NA | 3 | 3 | 3 |
| Geraniol | NA | NA | NA | 4 | 4 | 4 |
| d limonene | NA | NA | NA | NA | NA | 5 |
| Terpene hydrocarbons | NA | NA | NA | NA | NA | 5 |
| Terpinolene | NA | NA | NA | NA | NA | 5 |
| Linalool | NA | NA | NA | NA | NA | 5 |
| Citronellal | NA | NA | NA | NA | NA | 5 |
| Citronelly acetate | NA | NA | NA | NA | NA | 5 |
| Citronellyl formate | NA | NA | NA | NA | NA | 5 |
| Cinnamic acid | NA | NA | NA | NA | NA | 5 |
| Ethyl Heptanoate | NA | NA | NA | NA | NA | 5 |

Criteria for Evaluation
1 Completely clear
2 Slight dusting/hazy
3 Small crystals
4 Some Crystals
5 No Impact Example 8

A liquid concentrate sample was prepared using Stevia (Alpha from Pure Circle).

Chocolate concentrate to mixed with milk

| Ingredient | % |
|---|---|
| Water | 57.90 |
| Potassium Sorbate | 0.05 |
| Lecithinized Cocoa D-11-S-sol | 10.00 |
| Soy Lecithin ADM Solec 8160 | 0.50 |
| Sugar | 30.00 |
| Stevia | 1.00 |
| Salt | 0.05 |
| Vanilla flavor | 0.50 |
| Total | 100.00 |

The dry ingredients were mixed together for 10 mins using a US Stoneware roller jar mixer (serial number C298229). The mixed powder was then added to the water and mixed using a Tekmar shear mixer (SDT-181051, s/n 338244) until all of the powder was dispersed in the liquid. The sample was measured for solubility as defined in sections 46-47. The sample was rated as 1 on the scale after 1 week.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

The claims directed to the method of the present invention should not be limited to the performance of their steps in the order written except where expressly stated, and one skilled in the art can readily appreciate that the steps may be varied and still remain within the spirit and scope of the present invention.

We claim:

1. A food composition for a beverage concentrate comprising:
   5,000 ppm to 300,000 ppm by weight steviol glycoside;
   10,000 ppm to 750,000 ppm by volume food grade non-aqueous solvent; and
   25,000 ppm to 575,000 ppm by weight acid;
   with a balance being water,
   wherein the steviol glycoside remains in solution for at least 15 months.

2. The food composition of claim 1, wherein steviol glycoside is at least 95% rebaudioside A.

3. The food composition of claim 1, wherein the steviol glycoside comprises a mixture of stevioside and other steviol glycosides.

4. The food composition of claim 3, wherein the other steviol glycosides comprise rebaudioside A, rebaudioside B, rebaudioside C, rebaudioside D, and dulcoside A.

5. The food composition of claim 3, wherein the stevioside is present in a ppm ratio of stevioside:other steviol glycosides of from 1:1 to 1:1,500.

6. The food composition of claim 3, wherein the stevioside is present in a ppm ratio of stevioside:other steviol glycosides of from 1:20 to 1:500.

7. The food composition of claim 3, wherein the stevioside is present in a ppm ratio of stevioside:other steviol glycosides of from 1:20 to 1:100.

8. The food composition of claim 1, wherein the acid comprises an organic acid.

9. The food composition of claim 1, wherein the acid comprises an inorganic acid.

10. The food composition of claim 1, wherein the acid is selected from the group consisting of citric acid, malic acid, tartaric acid, phosphoric acid, lactic acid, fumaric acid, adipic acid, sodium acid sulfate; potassium acid sulfate, sodium acid pyrophosphate, and combinations thereof.

11. The food composition of claim 1, further comprising 500 ppm to 200,000 ppm of an amphiphilic substance.

12. The food composition of claim 11, wherein the amphiphilic substance is selected from the group consisting of lactic acid, terpineol, benzyl alcohol, 1-butanol, 1-propanol, propionic acid, caprylic acid, 2-methoxyphenol, butyric acid, hexanoic acid, isobutanol, 2-ethylpyrazine, 2-methylthiol-3-methyl pyrazine, benzaldehyde, pentanoic acid, 3-methylbutyl lactate, valeric acid, 2 mercaptopropinic acid, 4-allyl-2-methoxyphenol, phenyl acetic acid, phenethyl alcohol, 2-methoxy-4-[1-propen-1-yl]phenol, 9 decenoic acid, 5 & 6 decenoic acid, 1-octanol, 1-decanol, hexyl alcohol, and combinations thereof.

13. The food composition of claim 1, wherein the food grade non-aqueous solvent includes at least one of ethanol, propylene glycol, 1,3-propanediol, triacetin, ethyl acetate, benzyl alcohol, glycerin, and combinations thereof.

14. The food composition of claim 1, wherein steviol glycosides stay in solution for from 15 months to 33 months.

15. The food composition of claim 14, wherein the liquid concentrate can be reconstituted in a range of 1 part concentrate added to 5 parts water to 1 part concentrate added to 180 parts water.

16. The food composition of claim 14, wherein the liquid concentrate can be reconstituted in a range of 1 part concentrate added to 5 parts water to 1 part concentrate added to 180 parts water to produce a brix or brix equivalence of 2 to 25.

17. The food composition of claim 14, wherein the liquid concentrate can be reconstituted with a ratio of 1 part concentrate added to 5 parts water to produce a brix or brix equivalence of 2 to 25.

18. The food composition of claim 14, wherein the liquid concentrate can be reconstituted with a ratio of 1 part concentrate added to 90 parts water to produce a brix or brix equivalence of 2 to 25.

19. The food composition of claim 14, wherein the liquid concentrate can be reconstituted with a ratio of 1 part concentrate added to 120 parts water to produce a brix or brix equivalence of 2 to 25.

20. The food composition of claim 1, having a pH of 1.8 to 4.0.

21. The food composition of claim 1, wherein the acid is in an amount of 82,200 ppm to 575,000 ppm by weight.

* * * * *